United States Patent
Park et al.

(10) Patent No.: US 10,455,557 B2
(45) Date of Patent: Oct. 22, 2019

(54) METHOD OF SUPPORTING FOR UPLINK MULTI-USER TRANSMISSION IN WIRELESS AREA NETWORK SYSTEM

(71) Applicant: LG ELECTRONICS INC., Seoul (KR)

(72) Inventors: Hyunhee Park, Seoul (KR); Kiseon Ryu, Seoul (KR); Jeongki Kim, Seoul (KR); Hangyu Cho, Seoul (KR); Suhwook Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 173 days.

(21) Appl. No.: 15/424,674

(22) Filed: Feb. 3, 2017

(65) Prior Publication Data

US 2017/0230964 A1    Aug. 10, 2017

Related U.S. Application Data

(60) Provisional application No. 62/291,536, filed on Feb. 5, 2016, provisional application No. 62/294,313, filed
(Continued)

(51) Int. Cl.
*H04W 72/04* (2009.01)
*H04B 7/0452* (2017.01)
(Continued)

(52) U.S. Cl.
CPC ...... *H04W 72/0413* (2013.01); *H04B 7/0452* (2013.01); *H04L 1/0009* (2013.01);
(Continued)

(58) Field of Classification Search
CPC .......... H04W 72/0413; H04W 72/0453; H04B 7/0452; H04L 1/0009
See application file for complete search history.

(56) References Cited

U.S. PATENT DOCUMENTS

2016/0056930 A1* 2/2016 Seok .................. H04L 5/0026
370/330
2016/0105836 A1* 4/2016 Seok .................. H04W 72/042
370/331
(Continued)

OTHER PUBLICATIONS

LAN/MAN Standards Committee, "Draft Standard for Information technology—Telecommunications and information exchange between systems Local and metropolitan area networks—Specific requirements", doc.: IEEE P802.11ax/D1.0, Nov. 2016, 453 pages.

*Primary Examiner* — Ricky Q Ngo
*Assistant Examiner* — Stephen N Steiner
(74) *Attorney, Agent, or Firm* — Lee Hong Degerman Kang Waimey

(57) ABSTRACT

A method for a WLAN system of the present invention comprises receiving, by an AP, a request frame requesting change of operating mode of a receiving STA associated with the AP from the receiving STA, wherein the request frame includes a control indicator indicating whether the receiving STA participates in UL MU MIMO transmission, and transmitting a trigger frame for a plurality of user STAs participating in the UL MU MIMO transmission based on the request frame, wherein the trigger frame includes identification information for the plurality of user STAs, resource allocation information for allocation of uplink frequency resources allocated individually for the plurality of user STAs, time information indicating a time interval during which the UL MU MIMO transmission is performed, and coding information indicating a channel coding scheme allocated for each of the plurality of user STAs.

6 Claims, 29 Drawing Sheets

Related U.S. Application Data on Feb. 12, 2016, provisional application No. 62/296,102, filed on Feb. 17, 2016, provisional application No. 62/333,888, filed on May 10, 2016.

(51) Int. Cl.
    *H04L 1/00*     (2006.01)
    *H04W 84/12*     (2009.01)
    *H04B 7/06*     (2006.01)
    *H04W 74/00*     (2009.01)

(52) U.S. Cl.
    CPC ....... *H04W 72/0453* (2013.01); *H04B 7/0689* (2013.01); *H04L 1/0025* (2013.01); *H04W 74/004* (2013.01); *H04W 84/12* (2013.01)

(56) References Cited

U.S. PATENT DOCUMENTS

2016/0128024 A1*   5/2016   Frederiks ............... H04W 72/04
                                                               370/329
2016/0360443 A1*  12/2016   Hedayat ............... H04B 7/0452

\* cited by examiner

FIG. 1
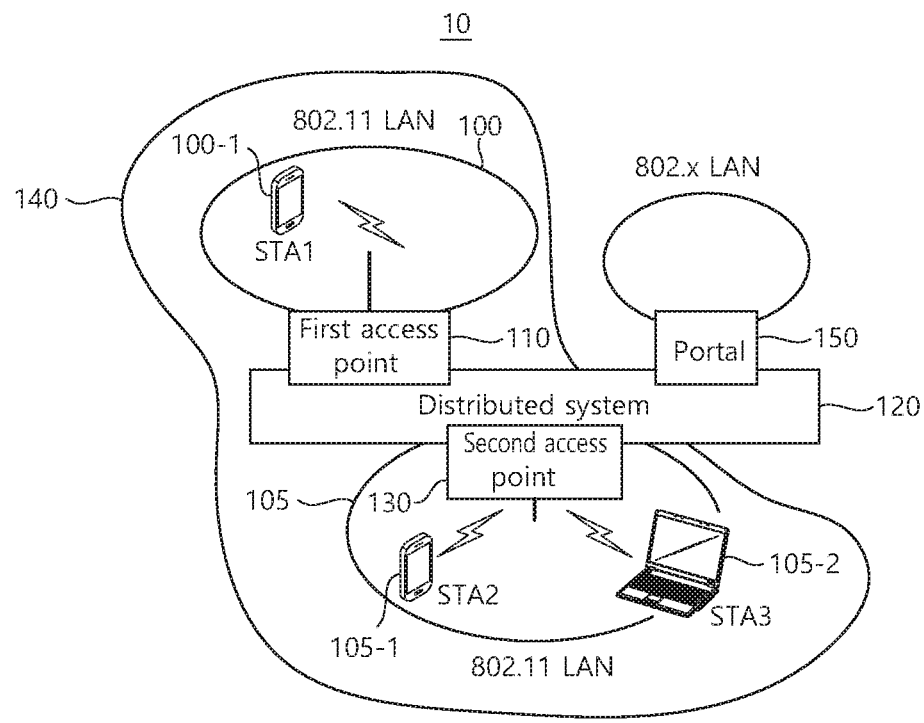
(A)
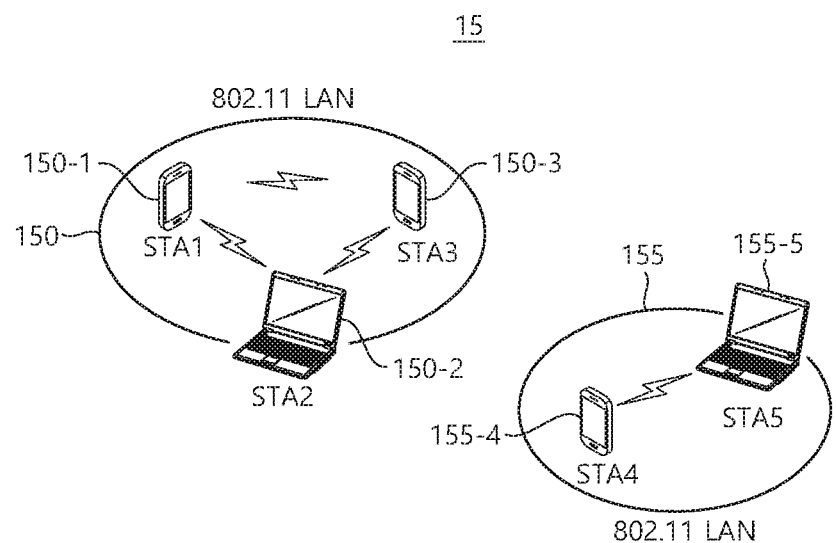
(B)

METHOD OF SUPPORTING FOR UPLINK MULTI-USER TRANSMISSION IN WIRELESS AREA NETWORK SYSTEM

CROSS-REFERENCE TO RELATED APPLICATIONS

Pursuant to 35 U.S.C. § 119(e), this application claims the benefit of U.S. Provisional Application No. 62/291,536, filed on Feb. 5, 2016, 62/294,313, filed on Feb. 12, 2016, 62/296,102, filed on Feb. 17, 2016, and 62/333,888, filed on May 10, 2016, the contents of which are all hereby incorporated by reference herein in their entirety.

TECHNICAL FIELD

The present invention relates to wireless communication and more particularly, a method for a wireless local area network system and a wireless device using the method.

BACKGROUND

Due to the recent advance of information and communication technology, various wireless communication technologies are under development. Among them, wireless local area network (in what follows, 'WLAN') is the technology which utilizes wireless frequency technology and supports portable devices to access the Internet wirelessly at home, office, or in a particular service area.

For example, portable devices may include a Personal Digital Assistant (PDA), portable computer (laptop computer), and Portable Multimedia Player (PMP). For most cases, devices of a WLAN system communicate with each other via a management entity such as a base station or an access point (AP). A management entity is responsible for scheduling for data communication.

To secure flexibility of communication among devices of WLAN system, various protocols are being proposed to implement direct communication among devices without involving a management entity. NAN is the specification defined by the WFA (Wi-Fi Alliance), based on the Wi-Fi standard. The NAN specification defines a synchronization and a search procedure among devices in the frequency band of 2.5 GHz or 5 GHz.

SUMMARY OF THE INVENTION

A method for a WLAN system according to one embodiment of the present invention comprises an AP's receiving a request frame requesting change of operating mode of an associated receiving STA from the receiving STA wherein the request frame includes a control indicator indicating whether the receiving STA participates in UL MU MIMO transmission; and the AP's transmitting a trigger frame for a plurality of user STAs participating in the UL MU MIMO transmission using the request frame wherein the trigger frame includes identification information for a plurality user STAs, resource allocation information for allocation of uplink frequency resources allocated respectively for the plurality of user STAs, time information indicating a time interval during which UL MU MIMO transmission is performed, MCS information indicating MCS allocated for each of the plurality of user STAs, and coding information indicating a channel coding scheme allocated to each of the plurality of user STAs.

BRIEF DESCRIPTION OF THE FIGURES

FIG. 1 is a conceptual view illustrating the structure of a wireless local area network.

DETAILED DESCRIPTION

Figure 2:
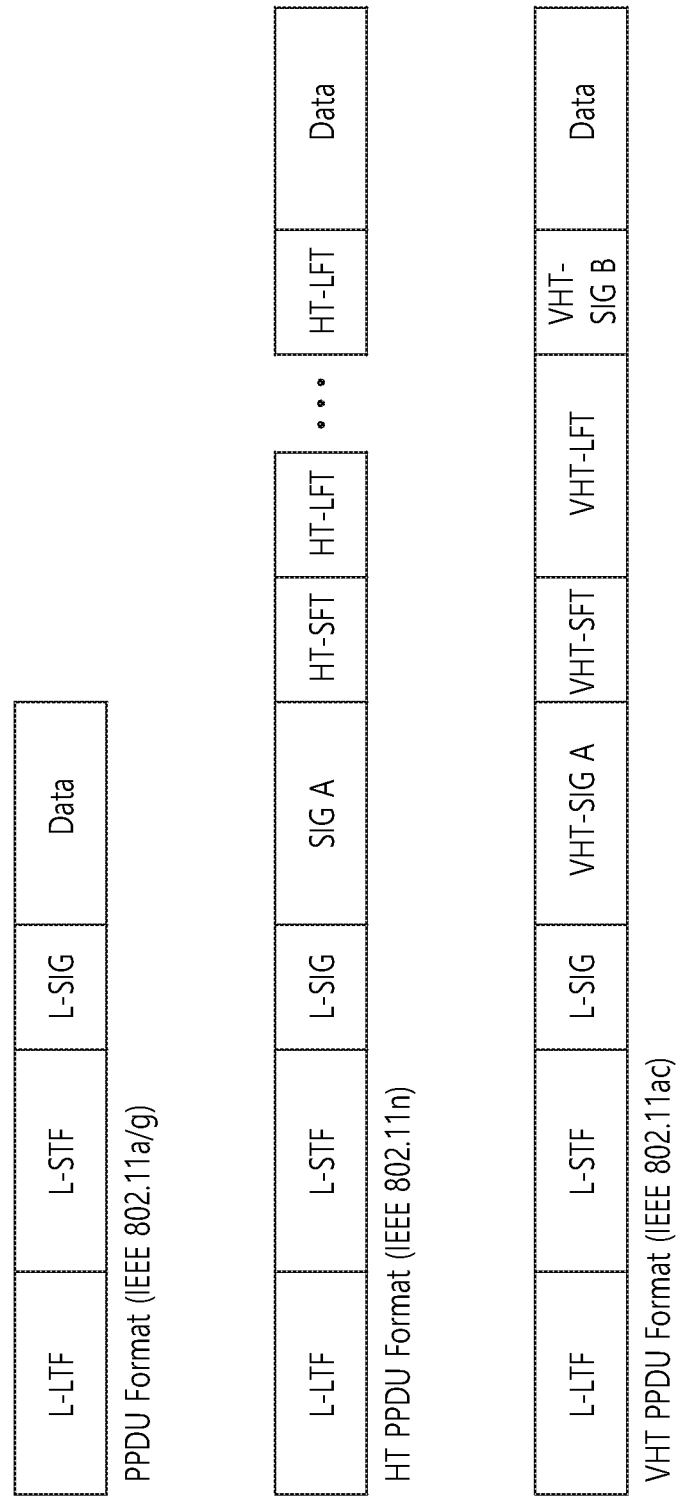
FIG. 2 is a diagram illustrating an example of a PPDU used in an IEEE standard.

The characteristics described above and the following detailed descriptions are all related to illustrative embodiments given to help describing and understanding the present invention. In other words, the present invention is not limited to the given embodiments but may be embodied in a different form. The following embodiments may be regarded as only examples intended to fully disclose the present invention and to describe the present invention for those skilled in the art to which the present invention belongs. Therefore, it should be clearly understood that in case various methods are available for implementing constituting elements of the present invention, a specific method or any one of methods having the same characteristic as the specific one may be used to realize the present invention.

In case it is said that a specific structure of the present invention includes particular elements, or a specific process includes particular steps, it may be understood that other elements or steps may be included in addition to the specific structure or process. In other words, the terms in this document are used only to describe a particular embodiment and are not used to limit the technical principles of the present invention. Furthermore, the embodiments introduced to help understanding the present invention include those embodiments complementary thereto.

The terms in this document should be understood in the context generally accepted by those skilled in the art to which the present invention belongs. General terms should be interpreted consistently according to the context of the present invention. Also, the terms used in this document should not be interpreted as excessively ideal or formal unless clearly defined otherwise. In what follows, embodiments of the present invention will be described with reference to appended figures.

FIG. 1 is a conceptual view illustrating the structure of a wireless local area network (WLAN). FIG. 1 (A) illustrates the structure of an infrastructure basic service set (BSS) of institute of electrical and electronic engineers (IEEE) 802.11.

Referring the FIG. 1 (A), the wireless LAN system (10) of the FIG. 1 (A) may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region.

For example, The BSS 100 may include one AP 110 and one or more STAs 100-1 which may be associated with one AP 110. The BSS 105 may include one or more STAs 105-1 and 105-2 which may be associated with one AP 130.

The infrastructure BSS 100, 105 may include at least one STA, APs 125, 130 providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 110 or 130 through the distribution system 120. The AP included in one ESS 140 may have the same service set identification (SSID).

A portal 150 may serve as a bridge which connects wireless LAN network (IEEE 802.11) and another network (e.g., 802.X).

In the BSS illustrated in the FIG. 1 (A), a network between the APs 110 and 130 and a network between the APs 110 and 130 and the STAs 100-1, 105-1, and 105-2 may be implemented.

FIG. 1 (B) illustrates a conceptual view illustrating the IBSS.

Referring to FIG. 1(B), differently from FIG. 1(A), the WLAN system 15 of FIG. 1(B) is capable of performing communication by forming a network among STAs without involving APs 110, 130. The network performing communication by forming a network among STAs without involving an AP 110, 130 is defined as an ad-hoc network or an independent basic service set (in what follows, it is called 'IBSS').

Referring to the FIG. 1 (B), the IBSS is a BSS that operates in an Ad-Hoc mode. Since the IBSS does not include the access point (AP), a centralized management entity that performs a management function at the center does not exist. That is, in the IBSS 15, STAs 150-1, 150-2, 150-3, 155-4, and 155-5 are managed by a distributed manner. In the IBSS, all STAs 150-1, 150-2, 150-3, 155-4, and 155-5 may be constituted as movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
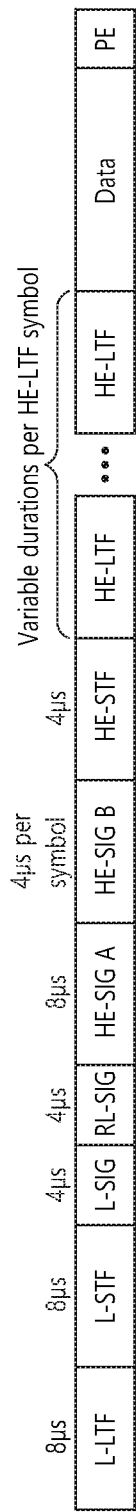
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs). More detailed description of the respective fields of FIG. 3 will be made below.

Figure 4:
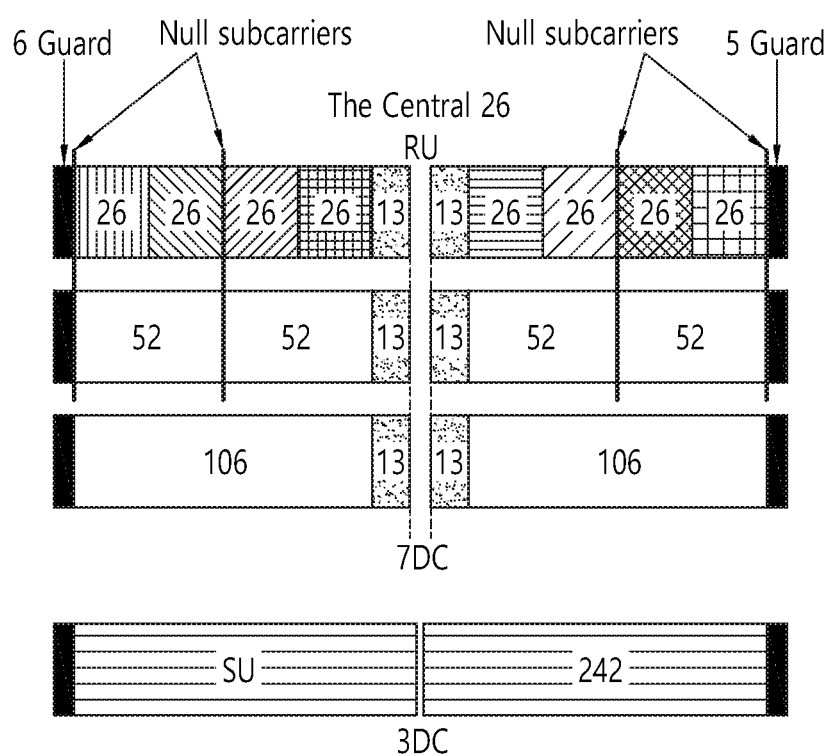
FIG. 4 is a diagram illustrating a layout of resource units used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated for the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and in this case, as illustrated in a lowermost part of FIG. 4, one 242-unit may be used and in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
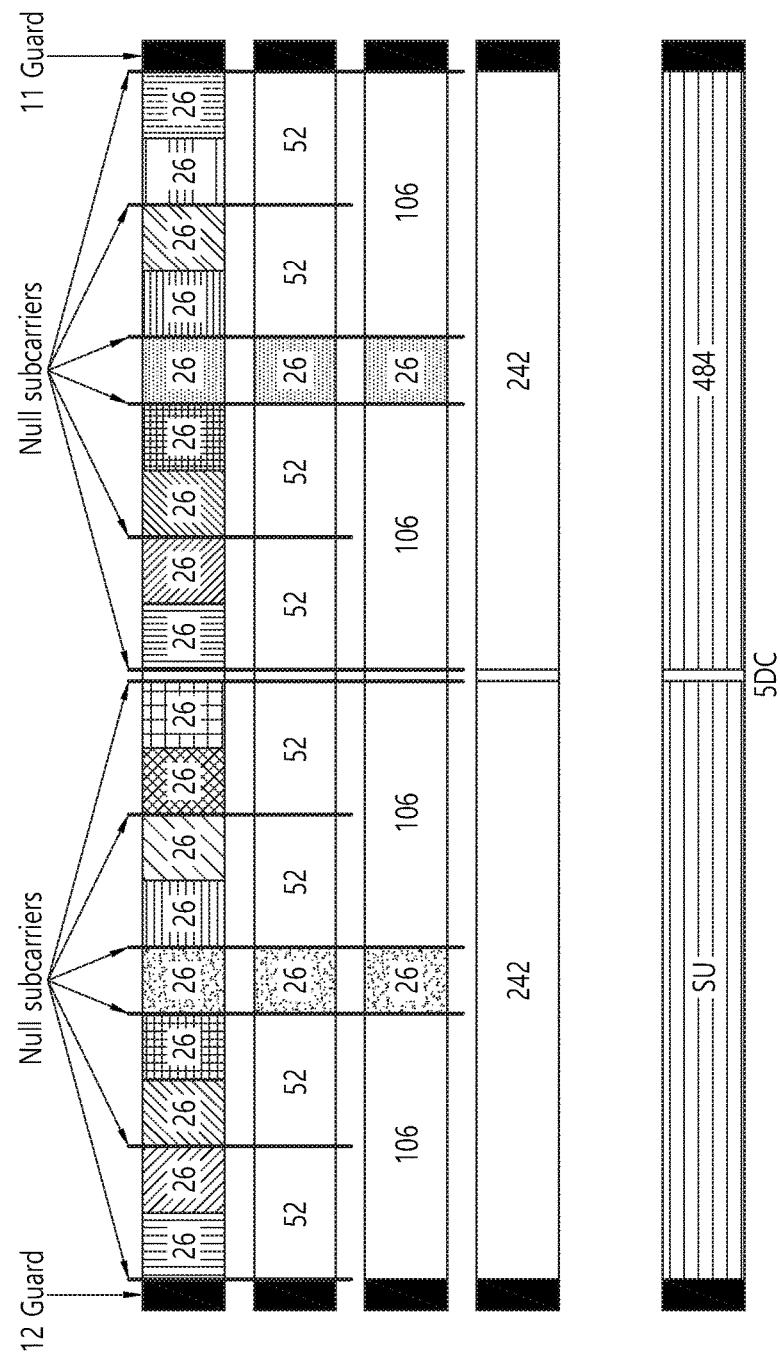
FIG. 5 is a diagram illustrating a layout of resource units used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
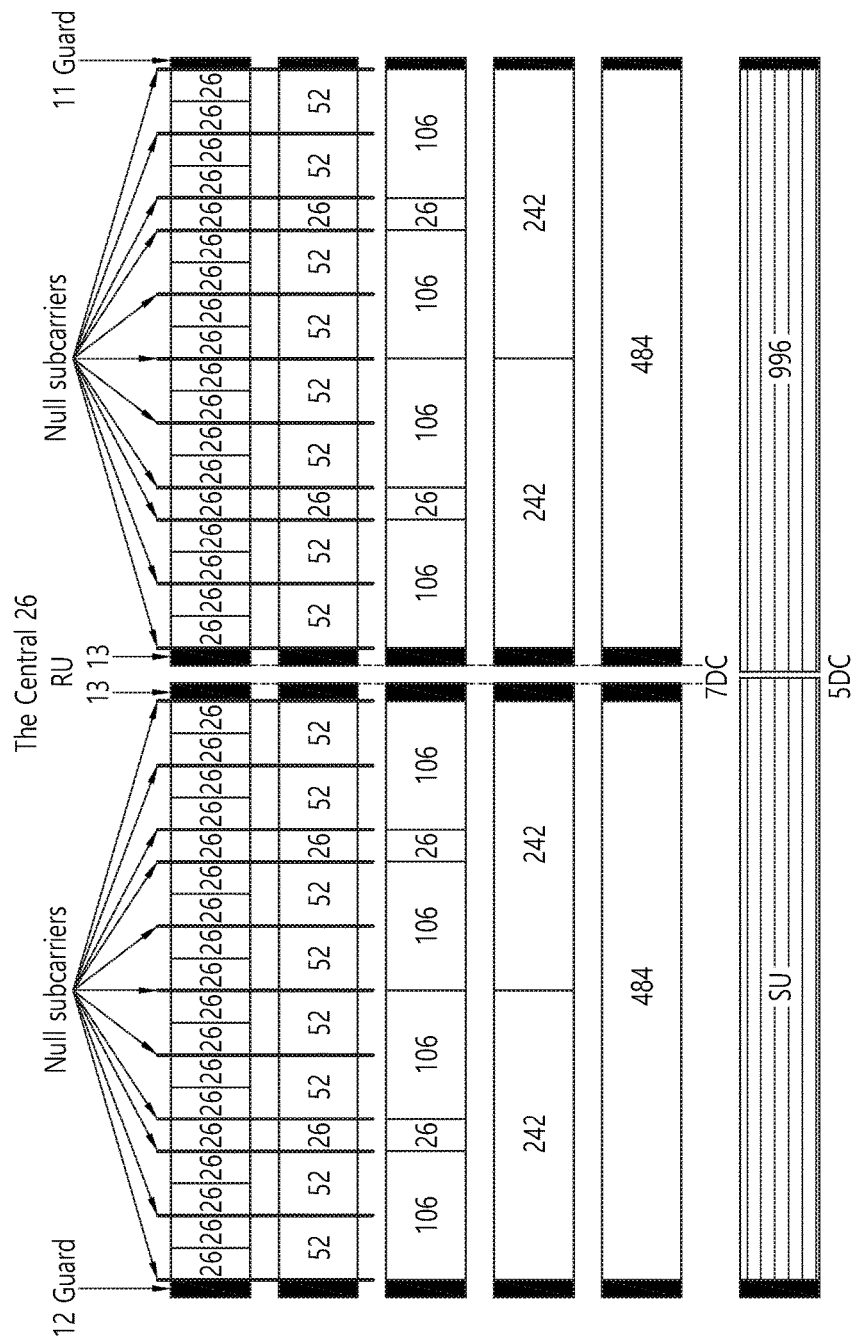
FIG. 6 is a diagram illustrating a layout of resource units used in a band of 80 MHz.

FIG. 6 is a diagram illustrating a layout of resource units (RUs) used in a band of 80 MHz.

Figure 26:
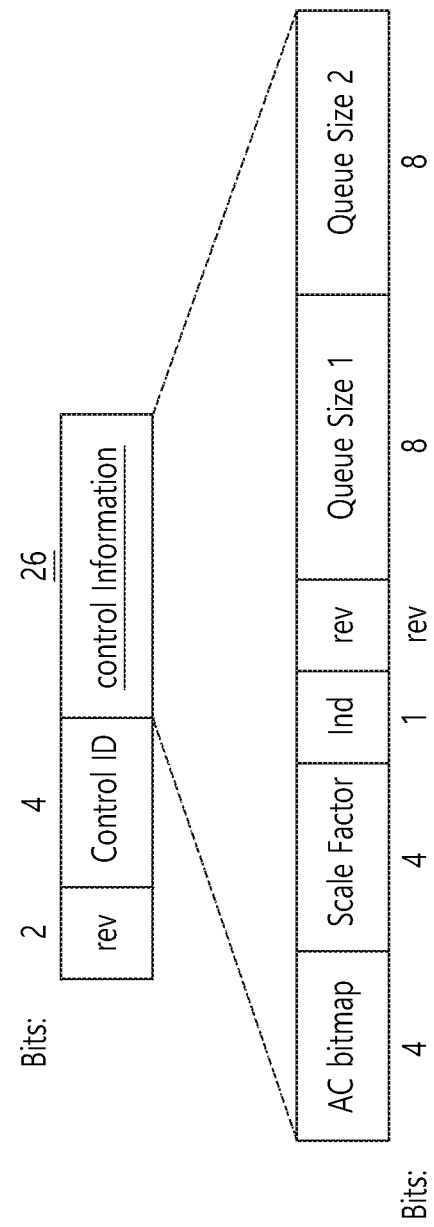
FIG. 26 illustrates a QoS control field for requesting change of operating mode in the control information subfield for buffer state report according to the present embodiment.

Similarly to a case in which the RUs having various RUs are used in one example of each of FIG. 4 or 5, 26-RU, 52-RU, 106-RU, 242-RU, 484-RU, and the like may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and in this case, 5 DC tones may be inserted. Meanwhile, the detailed number of RUs may be modified similarly to one example of each of FIG. 4 or 5.

Figure 7:
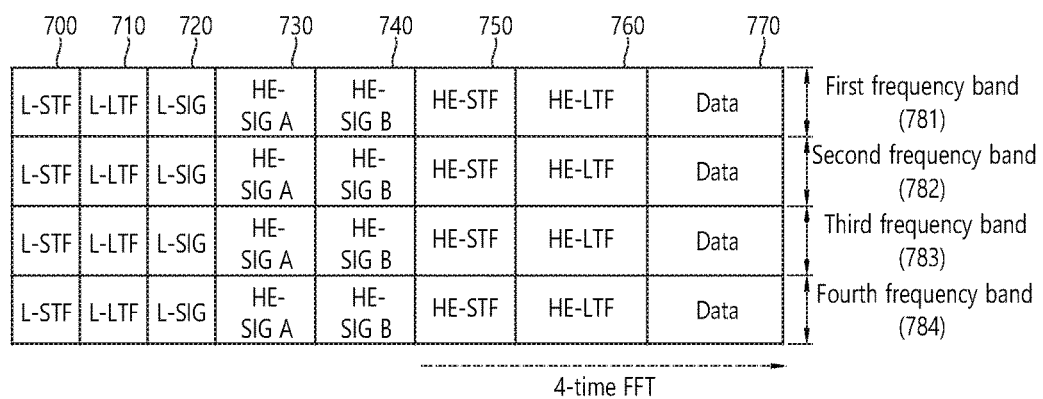
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF 700 may include a short training orthogonal frequency division multiplexing (OFDM) symbol. The L-STF 700 may be used for frame detection, automatic gain control (AGC), diversity detection, and coarse frequency/time synchronization.

An L-LTF 710 may include a long training orthogonal frequency division multiplexing (OFDM) symbol. The L-LTF 710 may be used for fine frequency/time synchronization and channel prediction.

An L-SIG 720 may be used for transmitting control information. The L-SIG 720 may include information regarding a data rate and a data length. Further, the L-SIG 720 may be repeatedly transmitted. That is, a new format, in which the L-SIG 720 is repeated (for example, may be referred to as R-LSIG) may be configured.

An HE-SIG-A 730 may include the control information common to the receiving station.

In detail, the HE-SIG-A 730 may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment.

An HE-SIG-B 740 may be included only in the case of the PPDU for the multiple users (MUs) as described above. Principally, an HE-SIG-A 750 or an HE-SIG-B 760 may include resource allocation information (alternatively, virtual resource allocation information) for at least one receiving STA.

The HE-SIG-B 740 will be described in more detail with reference to FIG. 8 below.

A previous field of the HE-SIG-B 740 may be transmitted in a duplicated form on an MU PPDU. In the case of the HE-SIG-B 740, the HE-SIG-B 740 transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B 740 in a specific frequency band (e.g., the second frequency band) is duplicated with the HE-SIG-B 740 of another frequency band (e.g., the fourth frequency band). Alternatively, the HE-SIG B 740 may be transmitted in an encoded form on all transmission resources. A field after the HE-SIG B 740 may include individual information for respective receiving STAs receiving the PPDU.

The HE-STF 750 may be used for improving automatic gain control estimation in a multiple input multiple output (MIMO) environment or an OFDMA environment.

The HE-LTF 760 may be used for estimating a channel in the MIMO environment or the OFDMA environment.

The size of fast Fourier transform (FFT)/inverse fast Fourier transform (IFFT) applied to the HE-STF 750 and the field after the HE-STF 750, and the size of the FFT/IFFT applied to the field before the HE-STF 750 may be different from each other. For example, the size of the FFT/IFFT applied to the HE-STF 750 and the field after the HE-STF 750 may be four times larger than the size of the FFT/IFFT applied to the field before the HE-STF 750.

For example, when at least one field of the L-STF 700, the L-LTF 710, the L-SIG 720, the HE-SIG-A 730, and the HE-SIG-B 740 on the PPDU of FIG. 7 is referred to as a first field, at least one of the data field 770, the HE-STF 750, and the HE-LTF 760 may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N (=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N (=4) times shorter than the IDFT/DFT period applied to each data symbol of the second field. That is, the IDFT/DFT length applied to each symbol of the first field of the HE PPDU may be expressed as 3.2 μs and the IDFT/DFT length applied to each symbol of the second field of the HE PPDU may be expressed as 3.2 μs*4 (=12.8 μs). The length of the OFDM symbol may be a value acquired by adding the length of a guard interval (GI) to the IDFT/DFT length. The length of the GI may have various values such as 0.4 μs, 0.8 μs, 1.6 μs, 2.4 μs, and 3.2 μs.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A 730 and may be instructed to receive the downlink PPDU based on the HE-SIG-A 730. In this case, the STA may perform decoding based on the FFT size changed from the HE-STF 750 and the field after the HE-STF 750. On the contrary, when the STA may not be instructed to receive the downlink PPDU based on the HE-SIG-A 730, the STA may stop the decoding and configure a network allocation vector (NAV). A cyclic prefix (CP) of the HE-STF 750 may have a larger size than the CP of another field and the during the CP period, the STA may perform the decoding for the downlink PPDU by changing the FFT size.

Hereinafter, in the embodiment of the present invention, data (alternatively, or a frame) which the AP transmits to the STA may be expressed as a terms called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLOP) header as another term and the PHY preamble may be expressed as a PLOP preamble as another term.

Further, a PPDU, a frame, and data transmitted through the uplink transmission may be expressed as terms such as an uplink PPDU, an uplink frame, and uplink data, respectively.

In the wireless LAN system to which the embodiment of the present description is applied, the whole bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources respective to each of the multiple STAs as uplink transmission resources based on OFDMA. Additionally, as described above, the frequency resources each being different from one another may correspond to different subbands (or sub-channels) or different resource units (RUs).

The different frequency resources respective to each of the multiple STAs are indicated through a trigger frame.

Figure 8:
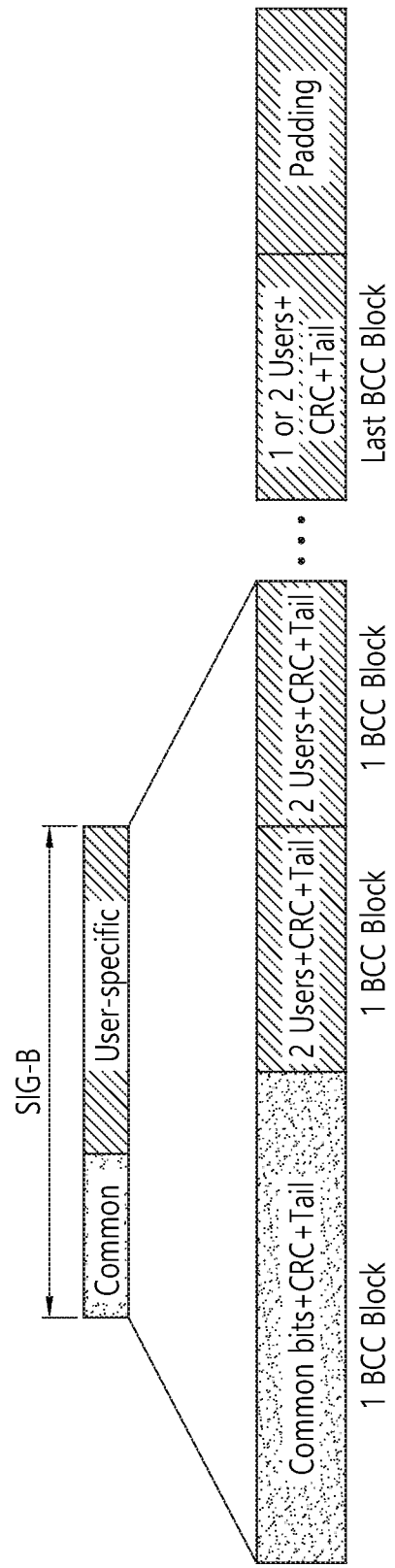
FIG. 8 is a block diagram illustrating one example of HE-SIG-B according to an embodiment.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

Figure 9:
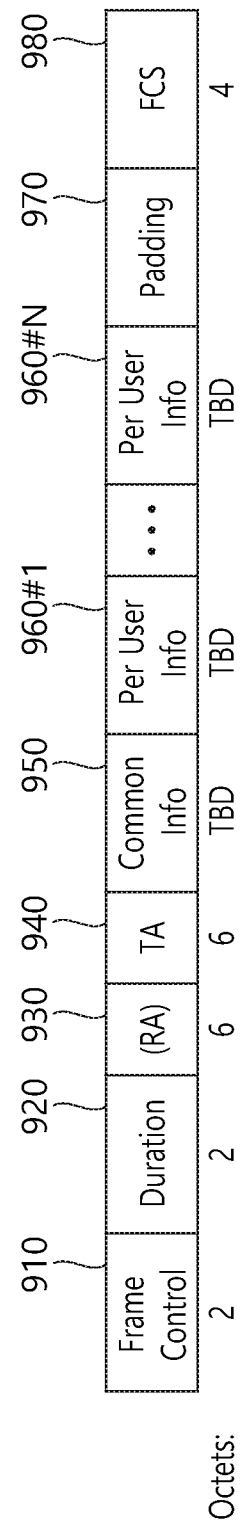
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field 910 shown in FIG. 9 may include information related to a version of the MAC protocol and other additional control information, and a Duration field 920 may include time information for configuring a NAV or information related to an identifier (e.g., AID) of the user equipment.

In addition, the RA field 930 may include address information of the receiving STA of a corresponding trigger frame, and may be optionally omitted. The TA field 940 includes address information of an STA (e.g., AP) for transmitting the trigger frame, and the common information field 950 includes common control information applied to the receiving STA for receiving the trigger frame.

It is preferable that the trigger frame of FIG. 9 includes per user information fields 960#1 to 960#N corresponding to the number of receiving STAs receiving the trigger frame of FIG. 9. The per user information field may also be referred to as a "RU Allocation field".

Additionally, the trigger frame of FIG. 9 may include a Padding field 970 and a Sequence field 980.

It is preferable that each of the per user information fields 960#1 to 960#N shown in FIG. 9 further includes multiple sub-fields.

Figure 10:
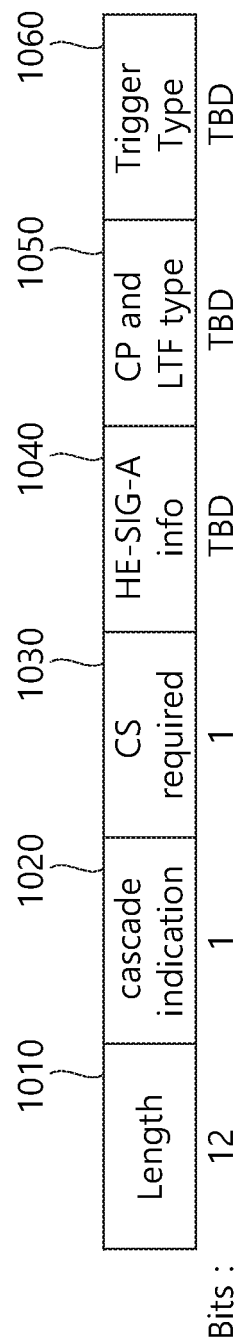
FIG. 10 illustrates an example of a sub-field included in a per user information field.

FIG. 10 illustrates an example of a sub-field included in a per user information field. Some parts of the sub-field of FIG. 10 may be omitted, and extra sub-fields may be added. Further, a length of each of the sub-fields shown herein may change.

As shown in the drawing, the Length field 1010 may be given that same value as the Length field of the L-SIG field of the uplink PPDU, which is transmitted in response to the corresponding trigger frame, and the Length field of the L-SIG field of the uplink PPDU indicates the length of the uplink PPDU. As a result, the Length field 1010 of the trigger frame may be used for indicating the length of its respective uplink PPDU.

Additionally, a Cascade Indicator field 1020 indicates whether or not a cascade operation is performed. The cascade operation refers to a downlink MU transmission and an uplink MU transmission being performed simultaneously within the same TXOP. More specifically, this refers to a case when a downlink MU transmission is first performed, and, then, after a predetermined period of time (e.g., SIFS), an uplink MU transmission is performed. During the cascade operation, only one transmitting device performing downlink communication (e.g., AP) may exist, and multiple transmitting devices performing uplink communication (e.g., non-AP) may exist.

A CS Request field 1030 indicates whether or not the status or NAV of a wireless medium is required to be considered in a situation where a receiving device that has received the corresponding trigger frame transmits the respective uplink PPDU.

A HE-SIG-A information field 1040 may include information controlling the content of a SIG-A field (i.e., HE-SIG-A field) of an uplink PPDU, which is being transmitted in response to the corresponding trigger frame.

A CP and LTF type field 1050 may include information on a LTF length and a CP length of the uplink PPDU being transmitted in response to the corresponding trigger frame. A trigger type field 1060 may indicate a purpose for which the corresponding trigger frame is being used, e.g., general triggering, triggering for beamforming, and so on, a request for a Block ACK/NACK, and so on.

Figure 11:
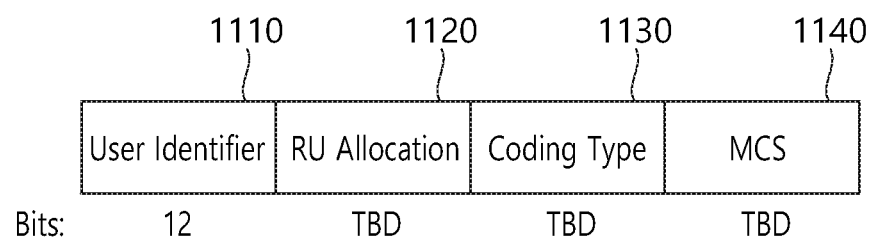
FIG. 11 illustrates an example of a sub-field being included in a per user information.

FIG. 11 illustrates an example of a sub-field being included in a per user information field. Among the sub-fields of FIG. 11, some may be omitted, and other additional sub-fields may also be added. Additionally, the length of each of the sub-fields shown in the drawing may be varied.

A User Identifier field 1110 indicates an identifier of an STA (i.e., receiving STA) to which the per user information corresponds, and an example of the identifier may correspond to all or part of the AID.

Additionally, a RU Allocation field 1120 may be included in the sub-field of the per user information field. More specifically, in case a receiving STA, which is identified by the User Identifier field 1110, transmits an uplink PPDU in response to the trigger frame of FIG. 9, the corresponding uplink PPDU is transmitted through the RU, which is indicated by the RU Allocation field 1120. In this case, it is preferable that the RU that is being indicated by the RU Allocation field 1120 corresponds to the RU shown in FIG. 4, FIG. 5, and FIG. 6.

The sub-field of FIG. 11 may include a Coding Type field 1130. The Coding Type field 1130 may indicate a coding type of the uplink PPDU being transmitted in response to the trigger frame of FIG. 9. For example, in case BBC coding is applied to the uplink PPDU, the Coding Type field 1130 may be set to '1', and, in case LDPC coding is applied to the uplink PPDU, the Coding Type field 1130 may be set to '0'.

Additionally, the sub-field of FIG. 11 may include a MCS field 1140. The MCS field 1140 may indicate a MCS scheme being applied to the uplink PPDU that is transmitted in response to the trigger frame of FIG. 9.

For example, in case BCC coding is applied to the uplink PPDU, the coding type field 1130 may be set to '1' while the coding type field 1130 may be set to '0' in case LDPC coding is applied.

Figure 12:
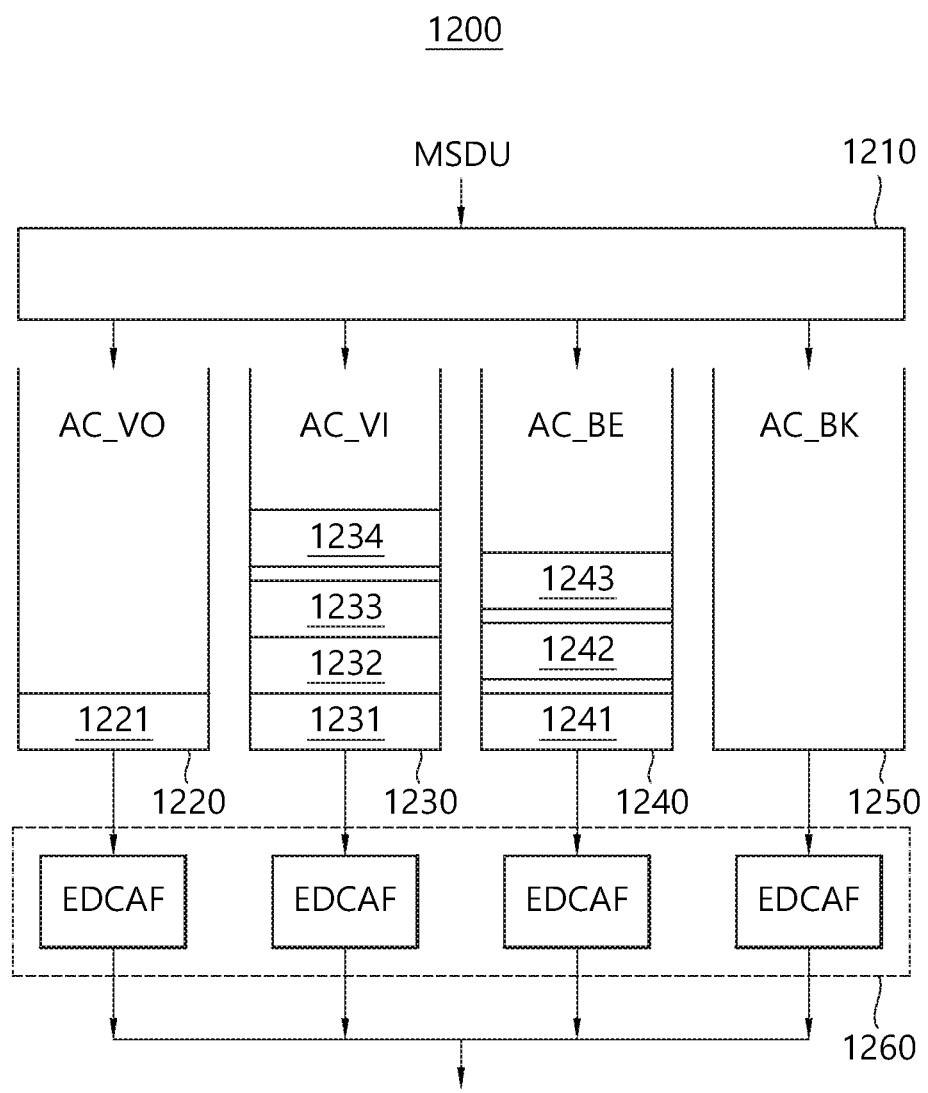
FIG. 12 illustrates an STA performing channel access based on EDCA in a WLAN system of the present embodiment.

FIG. 12 illustrates an STA performing channel access based on EDCA in a WLAN system of the present embodiment. An STA (or AP) performing EDCA (Enhanced Distributed Channel Access)-based channel access in a WLAN system may perform channel access by defining a plurality of user priorities for traffic data.

For transmission of QoS (Quality of Service) data frame based on a plurality of user priorities, EDCA may be defined by four access categories (in what follows, it is denoted as 'AC'): AC_BK (Background), AC_BE (Best Effort), AC_VI (Video), and AC_VO (Voice).

The STA performing EDCA-based channel access may map the traffic data arriving at the MAC (Medium Access Control) layer from the LLC (Logical Link Control) layer, namely the traffic data such as the MSDU (MAC Service Data Unit) as shown in Table 1 below. Table 1 shows mapping between a user priority and AC.

TABLE 1

| Priority | User priority | AC (Access Category) |
|---|---|---|
| Low | 1 | AC_BK |
|  | 2 | AC_BK |
|  | 0 | AC_BE |
|  | 3 | AC_BE |
|  | 4 | AC_VI |
|  | 5 | AC_VI |
|  | 6 | AC_VO |
| High | 7 | AC_VO |

A transmission queue and AC parameter may be defined for each AC. A plurality of user priorities may be implemented according to the AC parameter values set differently for each AC.

In other words, when performing a back-off procedure for transmitting frames belonging to the respective ACs, an STA performing EDCA-based channel access may use AIFS (Arbitration Interframe Space)[AC], CWmin[AC], and CWmax[AC] instead respectively of DIFS (DCF Interframe Space), CWmin, and CWmax which are parameters based on DCF (Distributed Coordination Function).

For each AC, the EDCA parameter used in the back-off procedure may be set to the default value or being carried by a beacon frame, may be delivered from the AP to each STA. Also, the smaller the values of AIFS[AC] and CWin[AC], the delay time for channel access becomes shorter; therefore, the corresponding STA may have a high priority and utilize more frequency bands in a given traffic environment.

The elements of an EDCS parameter set may include information about channel access parameters (for example, AIFS [AC], CWmin [AC], and CWmax [AC]) for the respective ACs.

In case an STA collides with other STA while transmitting a frame, the back-off procedure of the EDCA generating a new back-off count is similar to the back-off procedure of the conventional DCF. However, the back-off procedure tailored to each AC of the EDCA may be performed according to the EDCA parameters set individually for each AC. The EDCA parameter may be used as an important means for distinguishing a channel access of user priority traffic.

Setting up the EDCA parameter defined for each AC in an appropriate manner may not only optimize network performance but also increase a transmission effect due to traffic priority. Therefore, an AP may perform an overall management and coordination function for the EDCA parameters to ensure medium access fair to all of the STAs participating the network.

Referring to FIG. 12, one STA (or AP) 1200 may include a virtual mapper 1210, a plurality of transmission queues 1220-1250, and virtual collision processor 1260.

The virtual mapper 1210 of FIG. 12 may perform the role of mapping the MSDU received from the LLC (Logical Link Control) layer to the transmission queue corresponding to each AC according to Table 1 above.

The plurality of transmission queues 1220-1250 of FIG. 12 may perform the role of individual EDCA competing entities for wireless medium access within one STA (or AP).

For example, the transmission queue 1220 of AC VO type of FIG. 12 may include one frame 1221 for a second STA (not shown). The transmission queue 1230 of AC VI type may include three frames 1231-1233 for the first STA (not shown) and one frame 1234 for a third STA according to the order of transmission to the physical layer.

The transmission queue 1240 of AC BE type of FIG. 12 may include one frame 1241 for the second STA (not shown), one frame 1242 for the third STA (not shown), and one frame 1243 for the second STA (not shown) according to the order of transmission to the physical layer.

For example, the transmission queue 1250 of AC BE type FIG. 12 may not include a frame to be transmitted to the physical layer.

In case two or more ACs finish the back-off procedure, collision among ACs may be coordinated according to the function (EDCA function, EDCAF) included in the virtual collision handler 1260. In other words, the frame belonging to the AC having the highest priority may be transmitted first. Also, after the contention window value is increased, other ACs may update the value set to the back-off count.

TXOP (Transmission Opportunity) may begin when a channel is approached according to the EDCA rule. If two or more frames are stacked on one AC and EDCA TXOP is obtained, the AC of the EDCA MAC layer may attempt transmission of multiple frames. If the STA has already transmitted one frame and receives ACK with respect to the transmission of the next frame belonging to the same AC within the remaining TXOP time, the STA attempts transmission of the next frame after the SIFS time interval.

The TXOP limit value for the AP and the STA may be set to the default value, or a frame related to the TXOP limit value may be delivered from the AP to the STA.

In case the size of a data frame to be transmitted exceeds the TXOP limit value, the STA may fragment the data frame into several small frames. Next, the fragmented frames may be transmitted within the range that does not exceed the TXOP limit value.

Figure 13:
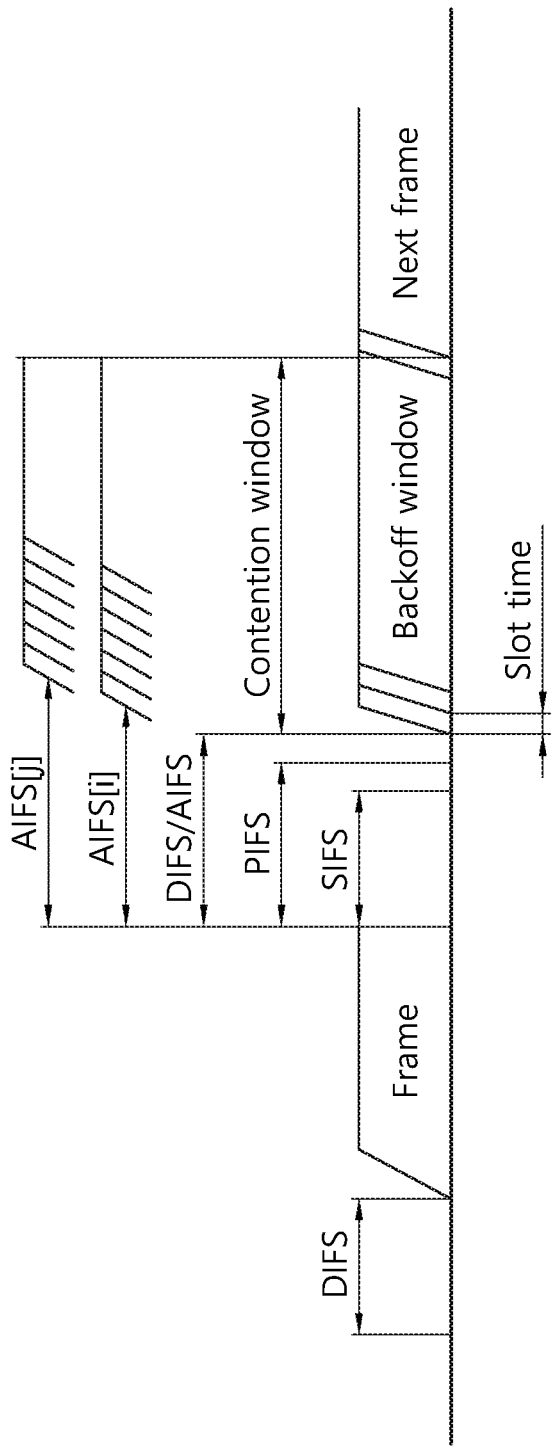
FIG. 13 illustrates a back-off procedure of EDCA according to the present embodiment.

FIG. 13 illustrates a back-off procedure of EDCA according to the present embodiment. Referring to FIGS. 12 and 13, each traffic data transmitted from an STA may perform the back-off procedure using the contention-based EDCA method according to the priority. For example, priorities assigned to the traffic data may be divided into 8 priorities as shown in Table 1.

As described above, different output queues are used according to the priorities within one STA (or AP), and each output queue operates according to the EDCA rule. Each output queue may transmit traffic data by using different AIFS (Arbitration Interframe Space) according to the corresponding priority instead of using the conventional DIFS (DCF Interframe Space).

Also, in case the STA has to transmit traffic data having a different priority in the same time interval, collision within the STA (or AP) may be avoided by transmitting the traffic data with a high priority first.

Each STA (or AP) configures backoff time (Tb[i]) for the backoff timer to start the backoff procedure. The backoff time (Tb[i]) is a pseudo-random integer value and may be calculated by using the following mathematical equation 1.

$$T_b[i] = \text{Random}(i) \times \text{SlotTime}. \qquad [\text{Eq. 1}]$$

In the equation above, Random(i) is a function generating a random integer ranging between 0 and CW[i] using the uniform distribution. CW[i] represents a contention window between the minimum contention window CWmin[i] and the maximum contention window CWmax[i], and i represents a traffic priority.

In case an STA performing the backoff procedure transmits a frame, and retransmission is required due to collision, the following mathematical equation 2 may be used. In other words, for each collision, a new contention window $CW_{new}[i]$ may be calculated by using the previous window $CW_{old}[i]$.

$$CW_{new}[i] = ((CW_{old}[i]+1) \times PF) - 1 \qquad [\text{Eq. 2}]$$

In Eq. 2, PF value may be calculated according to the procedure defined by the IEEE 802.11e standard. The EDCA parameters, CWmin[i], AIFS[i], and PF value may be set to the default values for each STA (or AP) or may be transmitted from the AP by using the QoS parameter set element.

In what follows, in the embodiment of the present invention, a device may be capable of supporting both the WLAN system and cellular system. In other words, the UE may be interpreted as a UE supporting the cellular system or an STA supporting the WLAN system.

Figure 14:
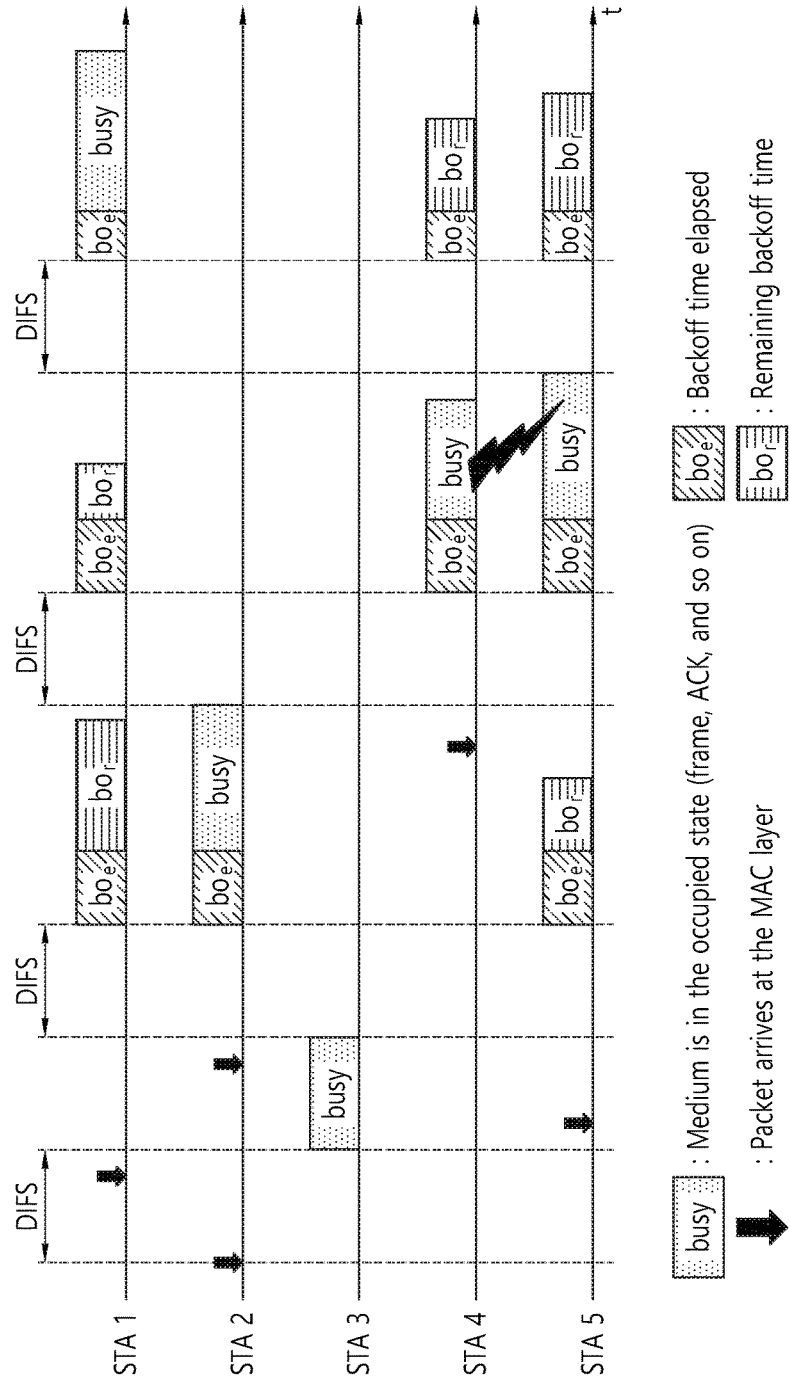
FIG. 14 illustrates a back-off period and a frame transmission procedure in a WLAN system according to the present invention.

In case the backoff procedure of the transmission queue 1230 of AC VI type of FIG. 14 is ended first using the Eqs. 1 and 2, the transmission queue 1230 of AC VI type may obtain a transmission opportunity to access the medium (TXOP).

The AP 1200 of FIG. 12 may determine the transmission queue 1230 of AC VI type as a primary AC and the remaining transmission queues 1220, 1240, 1250 as a secondary AC.

As described above, the process of performing the back-off procedure on a plurality of transmission queues 1220-1250 and of determining the transmission queue that first finishes the back-off procedure as the primary AC may be called a primary AC rule.

A transmission opportunity interval due to the TXOP may be determined by the primary AC determined by the primary AC rule. Also, the frames belonging to the secondary AC may be transmitted together to the transmission opportunity interval determined by the primary AC.

FIG. 14 illustrates a back-off period and a frame transmission procedure in a WLAN system according to the present invention.

Referring to FIGS. 13 and 14, if a particular medium changes its state from occupy or busy to idle, a plurality of STAs may attempt data (or frame) transmission. At this time, as a method for minimizing collision among STAs, each STA may select the backoff time (Tb[i]) and attempt transmission after waiting for a slot time corresponding to the backoff time.

Once the backoff procedure is initiated, the STA may count down the backoff count time in slot time units and continuously monitor the medium during the count down. Once the medium is monitored as being occupied, the STA may stop the countdown and wait. If the medium is monitored as being idle, the STA may resume the countdown.

Referring to FIG. 14, in case a packet for STA 3 arrives at the MAC layer of the STA 3, the STA 3 confirms that the medium is in the idle state as long as the DIFS and transmits the frame immediately. Although the inter frame space (IFS) of FIG. 14 shows the DIFS, the present invention is not limited to the specific illustration.

Meanwhile, the remaining STAs may monitor whether the medium is busy and wait. While waiting, STA 1, 2, and 5 may have data to transmit. If the medium is monitored as being idle, each STA waits for the time period of DIFS; each STA may count down each individual back-off time selected by each STA.

Referring to FIG. 14, STA 2 selects the shortest back-off time, and STA 1 selects the largest back-off count value. FIG. 14 illustrates the case in which the remaining back-off time of STA 5 is shorter than the remaining back-off time of STA 1 when STA 2 finishes the back-off procedure with respect to the selected back-off time and starts frame transmission.

While STA 2 occupies the medium, STA 1 and 5 may stop the back-off procedure and wait. If occupancy state of STA 2 changes from busy again to idle, STA 1 and 5 may resume the back-off procedure by using the remaining back-off time suspended after waiting for the DIFS. In this case, since the remaining backoff time of STA 5 is shorter than that of STA 1, STA 5 may transmit frames before STA 1.

Meanwhile, while STA 2 is occupying the medium, the data to be transmitted by STA 4 may arrive at the MAC layer of STA 4. If the medium enters the idle state, STA 4 may wait for a time period of DIFS and perform the backoff procedure by counting down the backoff time selected by STA 4.

Next, the remaining backoff time of STA 5 may happen to coincide with the backoff time of STA 4, thereby leading to collision between STA 4 and STA 5. At the occurrence of collision between STAs, both of STA 4 and STA 5 do not receive ACK and accordingly, may fail to transmit data.

Therefore, STA 4 and STA 5 may calculate new contention windows (CWnew[i]) individually according to Eq. 2 above. STA 4 and STA 5 may perform countdown of the backoff time newly calculated according to Eq. 1 above.

Meanwhile, while the medium is in the occupied state due to transmission of STA 4 and STA 5, STA 1 may be in a waiting state. Next, if the medium enters idle state, STA 1 may wait for a time period of DIFS, resume backoff counting, and transmit frames if the remaining backoff time is passed.

The CSMA/CA mechanism may include virtual carrier sensing in addition to physical carrier sensing by which an AP and/or STA directly senses the medium.

Virtual carrier sensing intends to complement a problem that may occur related to medium access, such as a hidden node problem. To implement virtual carrier sensing, MAC of the WLAN system uses a Network Allocation Vector (NAV). An AP and/or STA which still uses the medium or authorized to use the medium uses the NAV to indicate the remaining time before the medium returns to an available state for other AP and/or STA. Therefore, the value set for the NAV corresponds to a time period during which an AP and/or STA transmitting the corresponding frame is supposed to use the medium, and an STA receiving the NAV value is prohibited from medium access during the corresponding time period. The NAV value may be set according to the value of a duration field of the MAC header of a frame.

Figure 15:
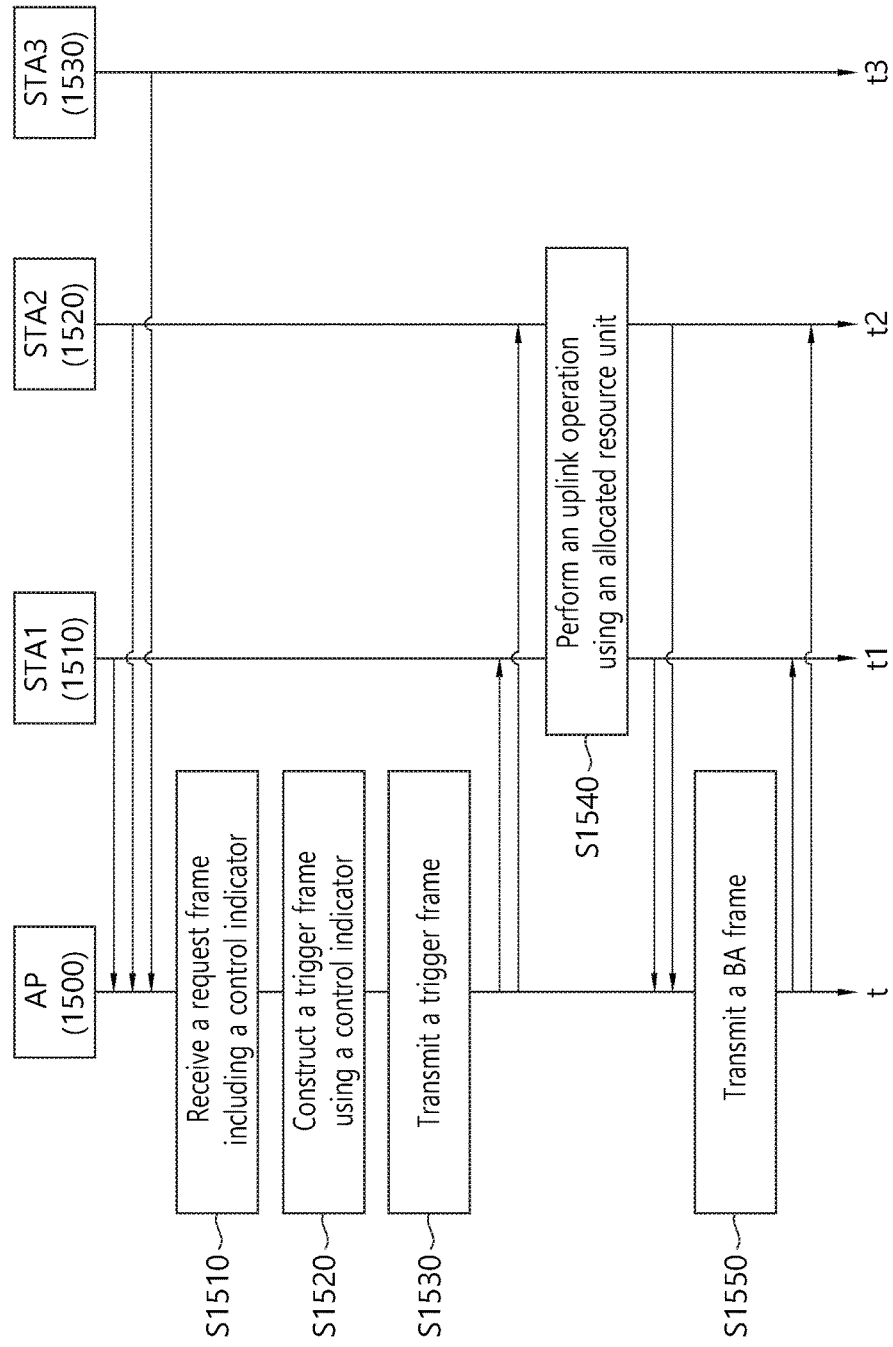
FIG. 15 illustrates a flow diagram of a method for a WLAN system according to the present embodiment.

FIG. 15 illustrates a flow diagram of a method for a WLAN system according to the present embodiment.

It may be understood from FIG. 15 that the operation of AP 1500 and operation of first user STA 1510 to third user STA 1530, non-AP STAs associated with the AP 1500 may be described with respect to the corresponding time axis (t, t1, t2, t3).

For a frame to be received from an AP, each user STA may request change of a reception operating mode of the user STA. Also, for a frame to be transmitted to an AP, each user STA may request change of transmission operating mode of the user STA. Descriptions related to the aforementioned operation will be given in mode details with reference to the drawings below.

Referring to FIGS. 1 to 15, in the S1510 step, an AP may receive a request frame requesting change of operating mode of each user STA individually from a plurality of user STAs. More specifically, the AP 1500 of FIG. 15 may receive a request frame including a control indicator requesting change of operating mode individually from the first 1510, the second 1520, and the third use STA 1530.

For example, the first user STA 1510 may transmit a first request frame including a first control indicator indicating participation of the first user STA 1510 in the UL MU MIMO (Uplink Multi-user Multiple-Input Multiple Output) transmission to the AP 1500.

The second user STA 1520 may transmit a second request frame including a second control indicator indicating participation of the second user STA 1520 in the UL MU MIMO transmission to the AP 1500. The third user STA 1530 may transmit to the AP 1500 a third request frame including a third control indicator indicating that the third user STA 1530 does not participate in the UL MU MIMO transmission.

In the present invention, STAs participating in the UL MU MIMO transmission may be referred to as STAs performing the UL MU (Uplink Multi-User) procedure. Also, the request frame mentioned in the S1510 step may be a QoS data frame or QoS null frame.

More specifically, the request frame of the present embodiment may deliver information about change of operating mode to the AP by using a specific field area of the QoS data frame or QoS null frame. Descriptions about the aforementioned operation will be described in more detail with reference to appended drawings below.

In the S1520 step, the AP 1500 may determine whether the user STAs which have requested a request frame from the AP 1500 participate in the UL MU MIMO operation by using a plurality of request frames received from the respective user STAs. Next, the AP 1500 may configure a trigger frame according to the determination result. Specific descriptions about the S1520 step will be described in detail with reference to FIG. 16 below.

In the S1530 step, the AP 1500 may transmit the trigger frame configured in the S1520 step to the user STA which has indicated participation in the UL MU MIMO transmission through a request frame. The trigger frame transmitted from the S1530 step may be understood on the basis of what has been described with reference to FIGS. 9 to 11 above.

For example, the trigger frame of the S1530 step may include identification information (for example, all or part of AID) corresponding to the first user STA 1510 in the individual user information field 1110 of FIG. 11 for the first user STA 1510 according to the first control indicator and RU allocation information which indicates a resource unit allocated for the first user STA 1510. Also, the trigger frame of the S1530 step may include identification information (for example, all or part of AID) corresponding to the second user STA 1520 in the individual user information field 1110 of FIG. 11 for the second user STA 1520 according to the second control indicator and RU allocation information indicating a resource unit allocated for the second user STA 1520.

In the S1540 step, each user STA participating in the UL MU MIMO transmission (namely performing the UL MU procedure) may transmit a trigger-based uplink frame in response to the trigger frame. For example, the first and the second user STAs 1510, 1520 may transmit uplink frames individually by using a resource unit allocated separately through the trigger frame in the overlapping time interval.

In the S1550 step, the AP 1500 may transmit a BA frame to inform of successful reception of an uplink frame received from the first and the second STA 1510, 1520. The BA frame will be described in more detail with reference to the drawings given below.

Figure 16:
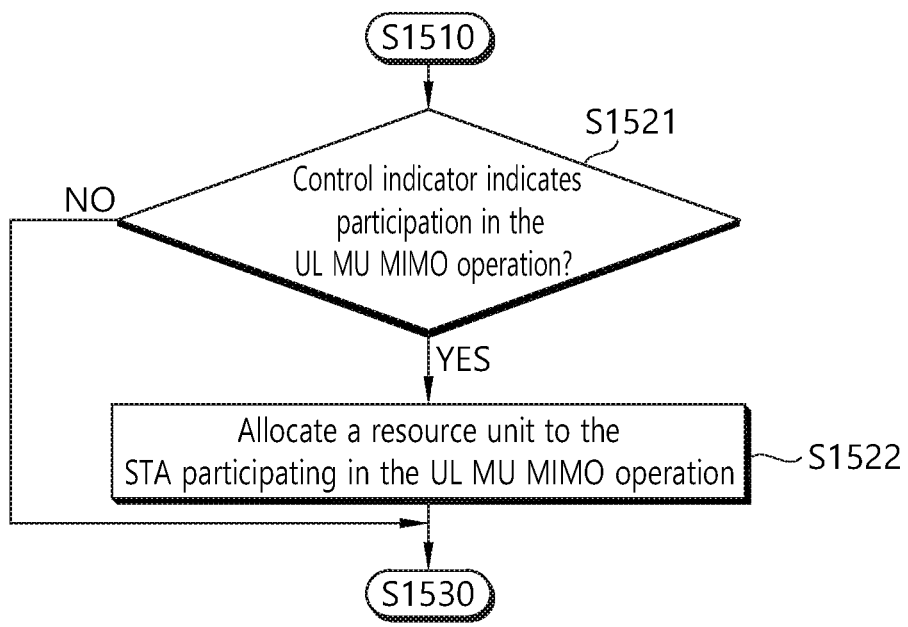
FIG. 16 is a flow diagram specifying one step of FIG. 15 according to the present embodiment.

FIG. 16 is a flow diagram specifying one step of FIG. 15 according to the present embodiment. With reference to FIGS. 1 to 16, the S1521 step may be performed following the S1510 step of FIG. 15.

In the S1521 step, the AP may determine whether each user STA participates in the UL MU MIMO transmission on the basis of the control indicator of the request frame received from the user STA.

For example, the user STA participating in the UL MU MIMO transmission may set the control indicator to '1'. The user STA not participating in the UL MU MIMO transmission may set the control indicator to '0'.

On the contrary, the user STA participating in the UL MU MIMO transmission may set the control indicator to '0'. The user STA not participating in the UL MU MIMO transmission may set the control indicator to '1'.

The AP 1500 may determine whether each user STA participates in the UL MU MIMO transmission on the basis of the first to the third indicator included in the first to the third request frame received from the first to the third user STA 1510, 1520, 1530.

If the AP 1500 determines from the control indicator received from the user STA that the corresponding user STA does not participate in the UL MU MIMO transmission, the AP 1500 may not allocate a resource unit for the user STA to the trigger frame for uplink operation.

The user STA not participating in the UL MU MIMO transmission may not receive a trigger frame from the AP. As a result, the user STA not participating in the UL MU MIMO transmission may perform uplink operation through the EDCA procedure or random access procedure.

It should be noted that the EDCA procedure introduced in this document may be understood through FIGS. 12 to 14 above. Also, the random access procedure introduced in this document may be understood by consulting the clause 27.5.2.6 of the standard document IEEE P802.11ax/D1.0 disclosed in November, 2016.

If the AP 1500 determines from the control indicator received from the user STA that the user STA does not participate in the UL MU MIMO transmission, the S1522 step may be performed. In the S1522 step, the AP 1500 may allocate a resource unit for the user STA to the trigger frame for uplink operation. Next, the S1530 step of FIG. 15 may be performed.

Figure 17:
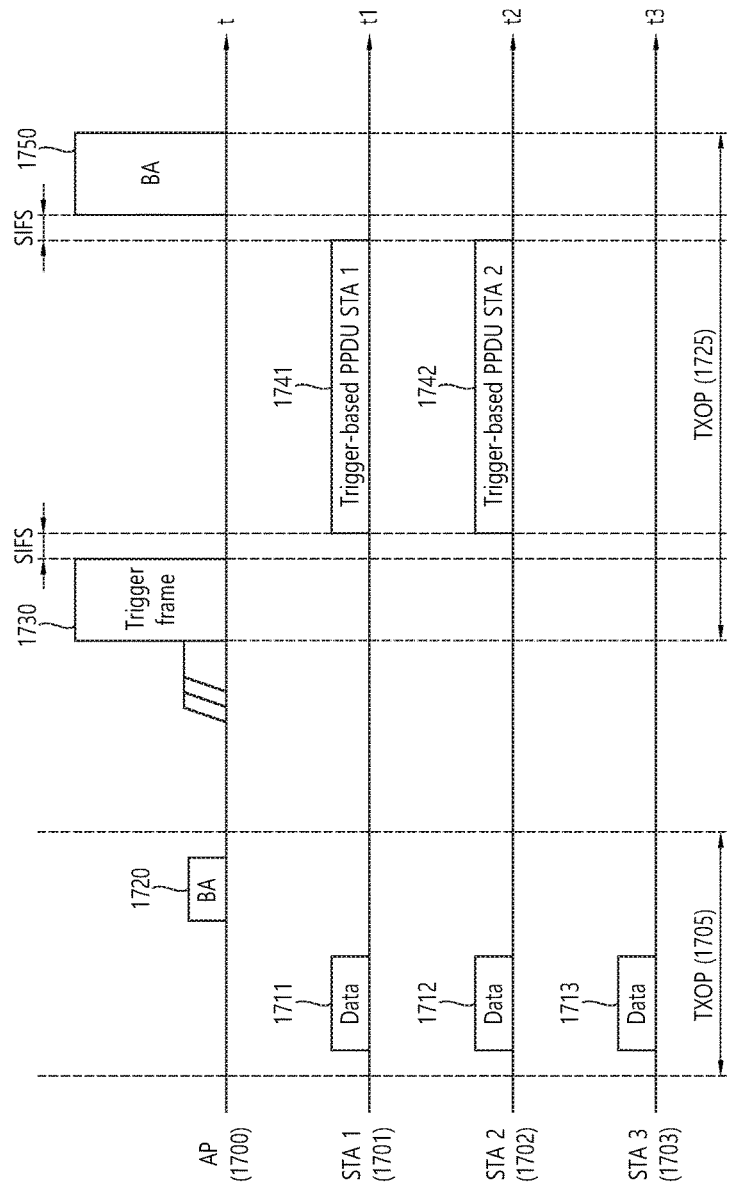
FIG. 17 illustrates a procedure of changing operating mode of a WLAN system according to the present embodiment.

FIG. 17 illustrates a procedure of changing operating mode of a WLAN system according to the present embodiment.

FIG. 17 may be understood from the descriptions give with reference to FIGS. 15 and 16. In other words, the AP 1700 of FIG. 17 may be regarded as the AP 1500 of FIG. 15. The first user STA 1701 of FIG. 17 may be regarded as the first user STA 1510 of FIG. 15. The second user STA 1702 of FIG. 17 may be regarded as the second user STA 1520 of FIG. 15. The third user STA 1703 of FIG. 17 may be regarded as the third user STA 1530 of FIG. 15.

In the first TXOP (Transmission Opportunity) 1705, the first to the third user STA 1701, 1702, 1703 may transmit the first to the third request frame 1711, 1712, 1713, respectively.

For example, the first to the third frame 1711, 1712, 1713 of FIG. 17 may be the frames transmitted from the first to the third user STA 1701, 1702, 1703 in response to the trigger frame (not shown in the figure) transmitted from the AP 1700 during the first TXOP 1705.

The first to the third request frame 1711, 1712, 1713 may be regarded as a QoS data frame or QoS null frame.

The first to the third user STA 1701, 1702, 1703 may deliver information about change of the operating mode to the AP by using a specific field area of the first to the third request frame 1711, 1712, 1713.

For example, the first user STA 1701 may transmit a first request frame 1711 including a first control indicator indicating the first user STA's 1701 participating in the UL MU MIMO transmission to the AP 1700. The second user STA 1702 may transmit a second request frame 1712 including a second control indicator indicating the second user STA's 1702 participating in the UL MU MIMO transmission to the AP 1700. The third user STA 1703 may transmit a third request frame 1713 including the third control indicator indicating that the third user STA 1703 does not participate in the UL MU MIMO transmission to the AP 1700.

The AP 1700 may transmit a BA (Block Acknowledgment) frame 1720 in response to the first to the third request frame 1711, 1712, 1713. Next, if a BA frame 1720 is received, each user STA may apply the operating mode requested from the AP through a request frame after the TXOP since the first TXOP 1705.

In other words, separately from the operating mode indicated by the control indicator of each user STA, each user STA may maintain the current operating mode for the first TXOP 1705. Next, each user STA may change its operating mode according to the control indicator during the second TXOP 1725.

As one example, separately from the signaling to the AP 1700 that the third user STA 1703 does not participate in the UL MU MIMO transmission, the third user STA 1703 may perform the current UL MU procedure in the first TXOP 1705.

Also, although FIG. 17 illustrates the case in which a plurality of request frames are transmitted during one TXOP, the present invention is not limited to the specific illustration. In other words, while passing through a plurality of TXOP intervals, the AP may receive data transmitted from a plurality of STAs.

In the second TXOP 1725, the AP 1700 may configure a trigger frame 1730 by using the first to the third request frame 1711, 1712, 1713.

The trigger frame 1730 of FIG. 17 may include identification information (for example, all or part of AID) corresponding to the second user STA 1520 for the second user STA 1702 and RU allocation information indicating a resource unit allocated for the second user STA 1520.

Also, the AP 1700 may configure the trigger frame so that a resource unit is not allocated to the third user STA 1703 which has informed of not participating in the UL MU MIMO transmission in the first TXOP 1705.

Each user STA 1701, 1702 participating in the UL MU MIMO transmission of FIG. 17 may transmit trigger-based uplink frames 1741, 1742 in response to the trigger frame 1730. For example, the first and the second user STA 1701, 1702 may transmit uplink frames 1741, 1742 through an overlapping time interval by using a resource unit allocated individually according to the trigger frame.

The AP 1700 may transmit a BA frame 1750 to inform of successful reception of an uplink frame 1741, 1742 received from the first and the second STA 1701, 1702. The BA frame according to the present invention will be described in more detail with reference to the drawings given below.

Figure 18:
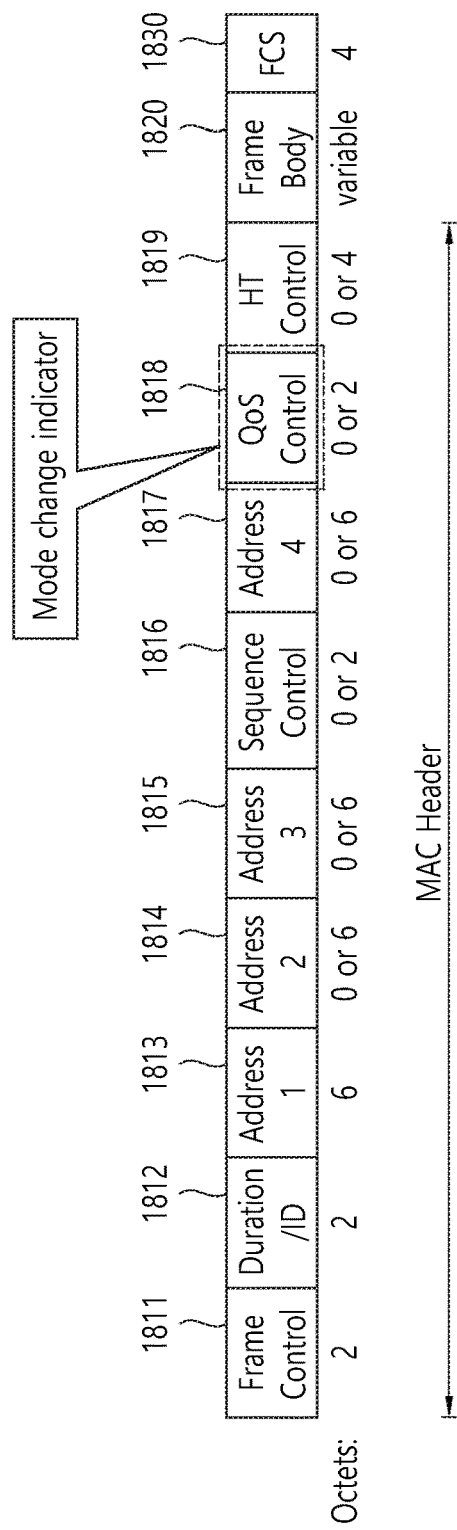
FIG. 18 illustrates one example of an MAC frame for another embodiment of the present invention.

FIG. 18 illustrates one example of an MAC frame for another embodiment of the present invention.

A conventional MAC frame according to another embodiment of the present invention may include a plurality of fields 1811-1819 and payload comprising the MAC header; and a frame body field 1820 and FCS field 1830 having a variable length.

Among the MAC header, frame control field 1811, duration/ID field 1812 and first address field 1813, and FCS field 1830 which is the last field of the MAC frame may be included in all of the frames.

On the contrary, the second address field 1814, third address field 1815, sequence control field 1816, fourth address field 1817, QoS control field 1818, HT control field 1819, and frame body field 1820 may be included selectively in a specific frame.

Also, when the frame control field 1811 indicates the QoS data frame or QoS null frame is indicated, the QoS control field 1818 may be included in the MAC frame.

The QoS control field 1818 comprises 2 octets (16 bits). The QoS control field 1818 may be structured as shown in Table 2 below.

field 1818 may indicate the queue size information of the traffic buffered in the queue of the STA.

In what follows, for the concise description of the present invention, it is assumed that the fifth bit (Bit4) of the QoS control field 1818 included in the QoS data frame or the QoS null frame is set to '1'.

In case a plurality of traffic data are buffered in the queue of the STA, the STA may inform the AP of the queue size information of the traffic data buffered in the STA by using the HT control field 1819 of the MAC frame. A detailed description of a method for signaling size information of a plurality of traffic data using the HT control field 1819 will be given with reference to the drawings below.

According to another embodiment of the present invention, an STA (or AP) may inform the AP of whether the operating mode requested by the STA is the first mode based on the UL MU procedure or second mode based on the EDCA procedure by using the queue size information.

As one example of an explicit method, if the first to the fourth bit (Bit0-3) of the QoS control field 1818 of FIG. 18 and Table 2 are set to '15', the AP (or STA) may regard the value set to the ninth bit to the sixteenth bit (Bit8-15) of the QoS control field 1818 as the mode change indicator.

In other words, if a reserved value of '15' is set to the first to the fourth bit (Bit0-3) of the QoS control field 1818, the AP may determine whether the operating mode requested by the STA is the first mode based on the UL MU procedure or second mode based on the EDCA procedure according to the mode change indicator.

For example, if the mode change indicator using the ninth bit to the sixteenth bit (Bit8-15) of the QoS control field 1818 indicates a value rather than '0', the AP may regard the non-zero value as the amount of traffic data buffered in a specific queue of the STA which has transmitted the corresponding QoS control field 1818. Furthermore, the AP according to another embodiment of the present invention may regard the STA which has transmitted the corresponding QoS control field 1818 as the STA requesting change of the operating mode to the first mode (UL MU procedure).

TABLE 2

| Applicable frame (sub) types | Bits 0-3 | Bit 4 | Bits 5-6 | Bit 7 | Bits 8 | Bit 9 | Bit 10 | Bits 11-15 |
|---|---|---|---|---|---|---|---|---|
| QoS Data and QoS Data + CF-Ack frames sent by non-AP STAs that are not a TPU buffer STA or a TPU sleep STA in a nonmesh BSS | TID | 0 | Ack Policy | A-MSDU Present | TXOP Duration Requested | | | |
| | TID | 1 | Ack Policy | A-MSDU Present | Queue Size | | | |
| QoS Null frames sent by non-AP STAs that are not a TPU buffer STA or a TPU sleep STA in a nonmesh BSS | TID | 0 | Ack Policy | Reserved | TXOP Duration Requested | | | |
| | TID | 1 | Ack Policy | Reserved | Queue Size | | | |

Referring to Table 2, the first to the fourth bit (Bit0-3) may be used as an area for traffic identifier (hereinafter, 'TID') information. The TID information may be mapped to any one of the 8 priorities (0-7) shown in Table 1. And the values of '8' to '15' that can be expressed using the first to the fourth bit (Bit0-3) may be reserved.

In other words, an STA (or AP) may inform of TID information about the traffic buffered in the STA through the first to the fourth bit (Bit0-3) of the QoS control field 1818.

If the fifth bit (Bit4) of the QoS control field is set to '1', the ninth to the sixteenth bit (Bit8-15) of the QoS control On the other hand, if the mode change indicator indicates '0', the AP according to another embodiment of the present invention may regard the STA which has transmitted the corresponding QoS control field 1818 as the STA requesting change of the operating mode to the second mode (EDCA procedure).

As another example of an explicit method, '15' may be set to the first to the fourth bit (Bit0-3) of the QoS control field 1818, and a value rather than '0' (the maximum value is '255' since the total number of bits is 8) may be set to the ninth to sixteenth bit (Bit8-15) of the QoS control field 1818.

In this case, the AP may regard the non-zero value of the ninth to sixteenth bit (Bit8-15) of the QoS control field 1818 as the total amount of traffic data buffered in the queue of the corresponding STA. Furthermore, the AP may regard the STA which has transmitted the corresponding QoS control field 1818 as the STA requesting change of the operating mode to the second mode (UL MU procedure).

As a yet another example of an explicit method, if '15' is set to the first to the fourth bit (Bit0-3) of the QoS control field 1818, and the mode change indicator using the ninth to sixteenth bit (Bit8-15) of the QoS control field 1818 indicates '255', the AP may regard the STA which has transmitted the corresponding QoS control field 1818 as the STA requesting change of the operating mode to the first mode (UL MU procedure).

On the other hand, if a reserved value of '15' is set to the first to the fourth bit (Bit0-3) of the QoS control field 1818, and the mode change indicator using the ninth to the sixteenth bit (Bit8-15) of the QoS control field 1818 indicates '0', the AP may regard the STA which has transmitted the corresponding QoS control field 1818 as the STA requesting change of the operating mode to the second mode (EDCA procedure).

As one example of an implicit method, the AP may regard the value set to the ninth to sixteenth bit (Bit8-15) of the QoS control field 1818 as the mode change indicator.

If the mode change indicator using the ninth to the sixteenth bit (Bit8-15) of the QoS control field 1818 indicates a value rather than '0' (namely an integer value equal to or less than the maximum value of '255'), the AP may determine existence of traffic data buffered in the STA which has transmitted the corresponding QoS control field 1818. Furthermore, the AP according to another embodiment of the present invention may regard the STA which has transmitted the corresponding QoS control field 1818 as the STA requesting change of the operating mode to the first mode (UL MU procedure).

Also, if the mode change indicator using the ninth to the sixteenth bit (Bit8-15) of the QoS control field 1818 indicates '0', the AP may determine nonexistence of traffic data buffered in the STA which has transmitted the corresponding QoS control field 1818. Furthermore, the AP according to another embodiment of the present invention may regard the STA which has transmitted the corresponding QoS control field 1818 as the STA requesting change of the operating mode into the second mode (EDCA procedure).

As another example of an implicit method, it may be understood that the AP may determine the operating mode requested by the STA not only using the queue size information described above but also using other information (for example, TXOP duration information of Table 2).

Figure 19:
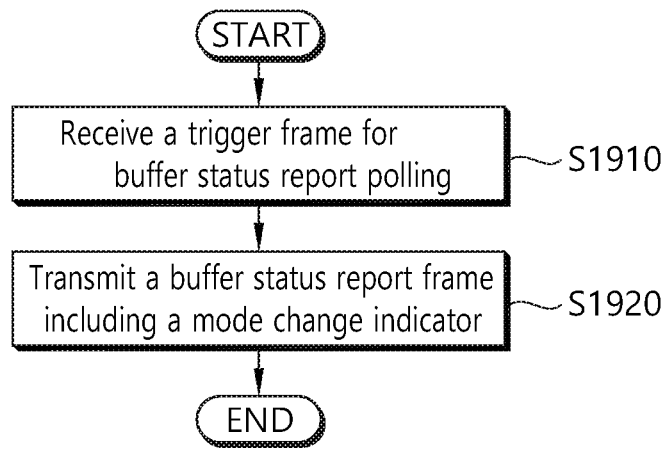
FIG. 19 is a flow diagram illustrating one example in which a user STA operating in a first mode according to another embodiment of the present invention requests mode change.

FIG. 19 is a flow diagram illustrating one example in which a user STA operating in a first mode according to another embodiment of the present invention requests mode change.

Referring to FIGS. 1 to 19, in the S1910 step, a plurality of user STAs participating in the UL MU MIMO (Uplink Multi-User Multiple Input Multiple Output) transmission may receive a trigger frame for buffer status report polling from the AP.

It should be noted that the trigger frame for the aforementioned buffer status report polling may be regarded as the BSRP frame described in the clause 9.3.1.23.5 of the standard document IEEE P802.11ax/D1.0 disclosed in November, 2016.

In the S1920 step, the user STA may transmit a buffer status report frame including a mode change indicator indicating change of the operating mode of the user STA. The mode change indicator of FIG. 19 may be understood from the descriptions given with reference to FIGS. 18 and 19.

For example, the buffer status report frame may be a QoS null frame. The mode change indicator may be transmitted to the AP by using the QoS control field 1818 included in the QoS null frame.

For example, the user STA may transmit a buffer status report frame in which the mode change indicator indicates a value rather than '0'. Through the transmission, the user STA may inform the AP of maintaining the first mode based on the UL MU procedure.

As another example, the user STA may transmit a buffer status report frame in which the mode change indicator indicates '0'. Through the transmission, the user STA may inform the AP of mode change to the second mode based on the EDCA procedure from the first mode based on the UL MU procedure.

Figure 20:
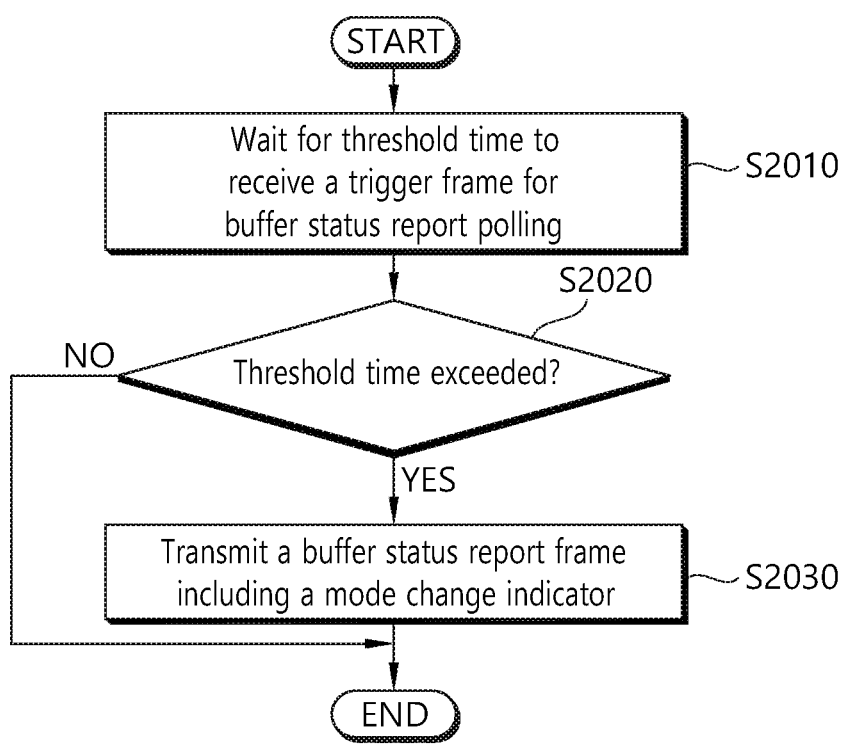
FIG. 20 is a flow diagram illustrating another example in which a user STA operating in a first mode according to another embodiment of the present invention requests mode change.

FIG. 20 is a flow diagram illustrating another example in which a user STA operating in a first mode according to another embodiment of the present invention requests mode change.

Referring to FIGS. 1 to 20, in the S2010 step, the user STA participating in the UL MU MIMO transmission may wait for a threshold time period to receive a trigger frame for buffer status report polling from the AP. For example, the threshold time may be the time set for the STA in advance.

In the S2020 step, the user STA may determine whether the threshold time has passed. If the threshold time is not passed, the operating step is stopped.

If the threshold time is passed, the S2030 step may be performed. In the S2030 step, the user STA may transmit a request frame to the AP. In this case, the request frame may include the mode change indicator described with reference to FIGS. 18 and 19.

Moreover, in case the request frame is a QoS data frame or QoS null frame, the user STA may inform the AP of additional information by using the more data bit indicator included in the frame control field 1811 of the MAC header of FIG. 18.

The more data bit indicator may be understood from the clause 9.4.2.1.8 of the standard document IEEE P802.11ax/ D1.0 disclosed in November 2016.

Figure 21:
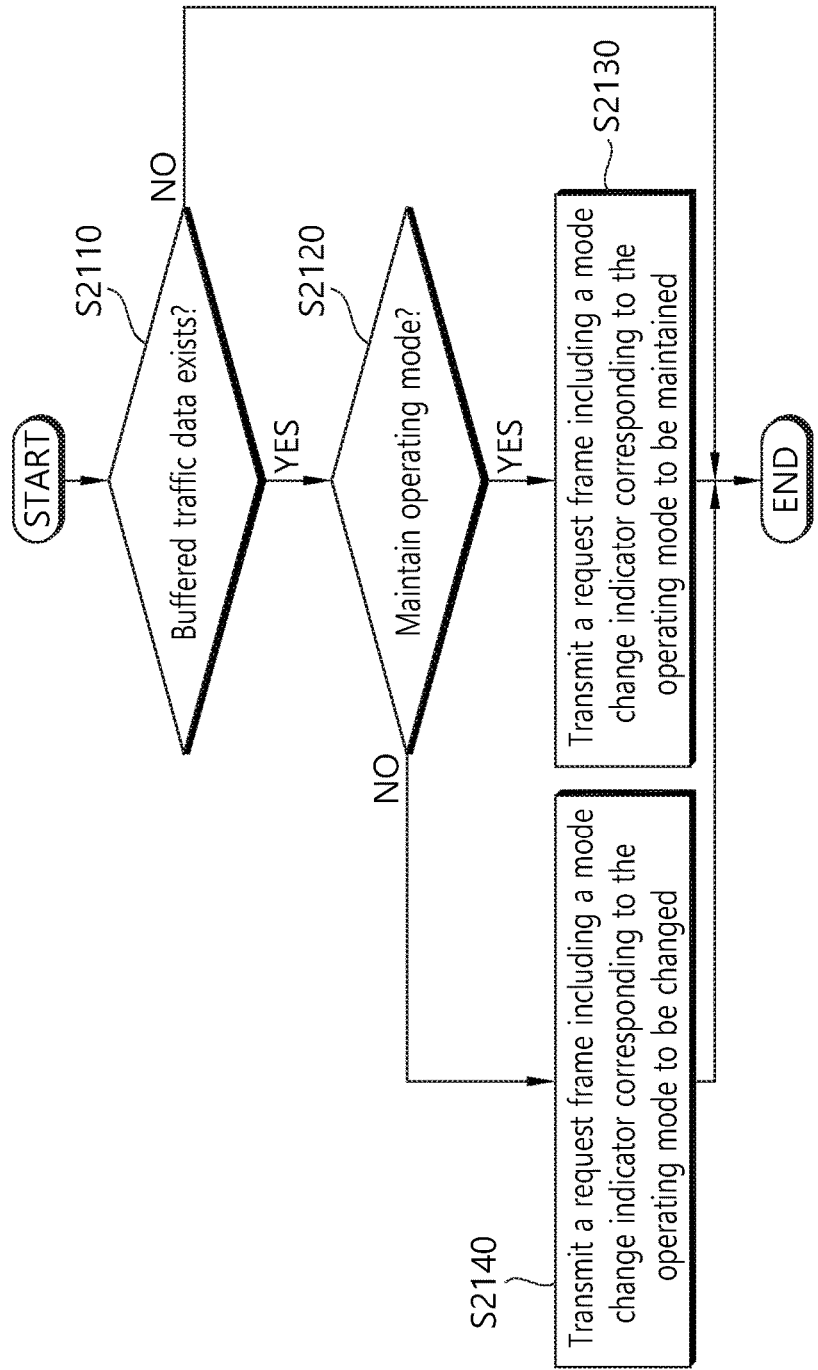
FIG. 21 is a flow diagram illustrating one example in which a user STA operating in a specific operating mode according to another embodiment of the present invention requests mode change.

FIG. 21 is a flow diagram illustrating one example in which a user STA operating in a specific operating mode according to another embodiment of the present invention requests mode change.

Referring to FIGS. 1 to 21, in the S2110 step, the user STA operating in a specific mode may determine existence of traffic data buffered in the user STA.

For example, the user STA not participating in the UL MU MIMO transmission but operating in the second mode based on the EDCA procedure may determine existence of traffic data buffered in the queue of the STA. In case no traffic data is buffered in the queue of the STA, the aforementioned step may be terminated.

In the S2120 step, the user STA may determine whether to maintain the operating mode. In case the user STA determines to maintain the current operating mode, the S2130 step may be performed.

In the S2130 step, the user STA may transmit a request frame including the mode change indicator corresponding to the operating mode to maintain to the AP. In this case, the request frame may indicate the mode change indicator described with reference to FIGS. 18 and 19. For example, the use STA maintaining the second mode may set the mode change indicator to '0'.

In case the user STA determines to change the current operating mode, the S2140 step may be performed. In the S2140 step, the user STA may transmit the request frame including the mode change indicator corresponding to the operating mode to be changed to the AP. In this case, the request frame may indicate the mode change indicator described with reference to FIGS. 18 and 19.

For example, the user STA requesting mode change from the second mode to the first mode may set the mode change indicator to a value rather than '0'. The request frame transmitted in the S2130 and S2140 step may be transmitted to the AP through the random access procedure or EDCA procedure.

Furthermore, the more data bit indicator and mode change indicator may be represented by using the <x, y> indicator. It is assumed that the user STA is operating in the second mode based on the EDCA procedure.

For example, the AP which receives a request frame, <x, y> indicator of which is <0,0> may determine that the user STA does not have buffered traffic data and maintains the second mode.

As another example, the AP which receives a request frame, <x, y> indicator of which is <0, 0> determines that buffered traffic data exists in the user STA. Also, the AP may determine that the received request frame is the frame for which the user STA requests maintaining the second mode for buffered traffic data.

As another example, the AP which receives a request frame, <x, y> indicator of which is a value rather than <1, 0> may determine that buffered traffic data exists in the user STA. Also, the AP may regard the received request frame as the frame for which the user STA requests to change its mode from the second to the first mode for the buffered traffic data.

Figure 22:
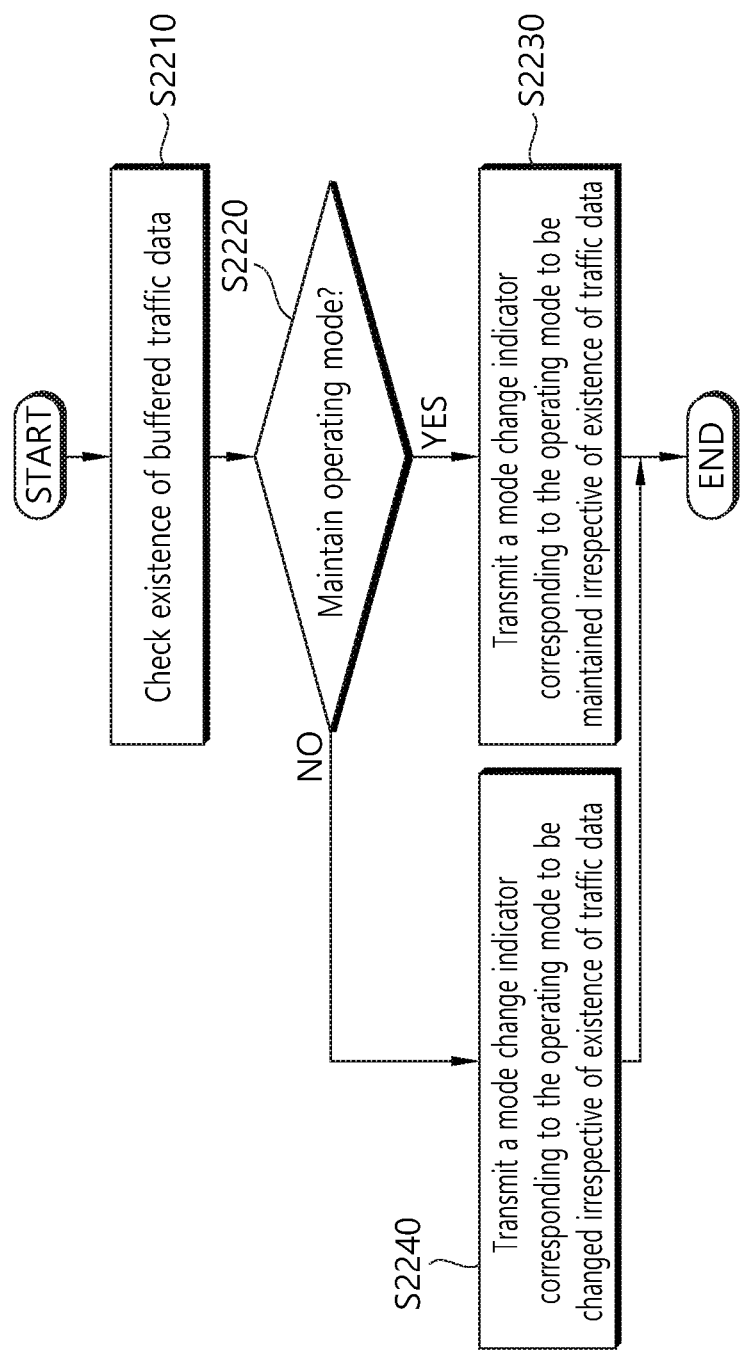
FIG. 22 is a flow diagram illustrating a yet another example in which a user STA operating in a specific mode according to another embodiment of the present invention requests mode change.

FIG. 22 is a flow diagram illustrating a yet another example in which a user STA operating in a specific mode according to another embodiment of the present invention requests mode change.

The user STA may operate in the first mode based on the UL MU procedure, participating in the UL MU MIMO transmission. Or the user STA may operate in the second mode based on the EDCA procedure, without participating in the UL MU MI MO transmission.

Referring to FIGS. 1 to 22, in the S2110 step, the user STA operating in a specific mode may check whether buffered traffic data exists in the user STA.

In the S2220 step, the user STA may determine whether to maintain the operating mode. For example, the user STA operating in the first mode may determine to maintain the first mode. Or the user STA operating in the first mode may determine to perform change of the operating mode to the second mode.

As another example, the user STA operating in the second mode may determine to maintain the second mode. Or the user STA operating in the second mode may determine to perform change of the operating mode to the first mode.

In the S2230 step, the user STA which has determined to maintain the operating mode may transmit a request frame including the mode change indicator corresponding to the operating mode to be maintained to the AP.

For example, in case the user STA operating in the first mode determines to maintain the first mode, the user STA may set the mode change indicator to '0' irrespective of existence of the traffic data buffered in the user STA to indicate maintaining the operating mode.

As another example, in case the user STA operating in the second mode determines to maintain the second mode, the user STA may set the mode change indicator to '0' irrespective of existence of the traffic data buffered in the user STA to indicate maintaining the operating mode.

In the S2240 step, the user STA which has determined to change the operating mode may transmit a request frame including the mode change indicator corresponding to the operating mode to be changed to the AP.

For example, in case the user STA operating in the first mode determines to change the operating mode to the second mode, the user STA may set the mode change indicator to '0' irrespective of existence of traffic data buffered in the user STA to indicate change of the operating mode.

As another example, in case the user STA operating in the second mode determines to change the operating mode to the first mode, the user STA may set the mode change indicator to '0' irrespective of existence of traffic data buffered in the user STA to indicate change of the operating mode. A value rather than '0' may indicate the amount of traffic data buffered in the user STA.

Considering the embodiments of FIGS. 18 to 22 collectively, an AP belonging to a WLAN system according to the present invention may reduce the number of unnecessary polling operations for a user STA. Accordingly, the overall overhead on the WLAN system is reduced, and thus a WLAN system with enhanced performance may be provided.

Figure 23:
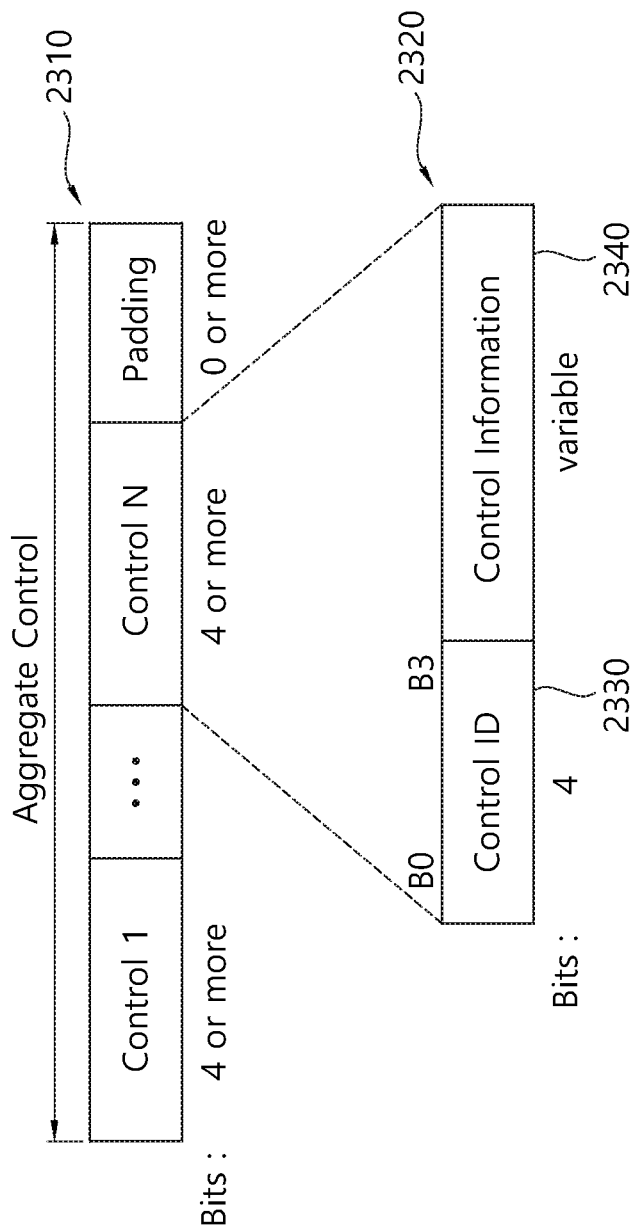
FIG. 23 shows an illustrative format of A-Control field according to the present embodiment.

FIG. 23 shows an illustrative format of A-Control field according to the present embodiment. Referring to FIGS. 18 and 23, the A-Control field 2310 of FIG. 23 illustrates a subfield of the HT control field 1890 of FIG. 18.

More specifically, if the first and the second bit (Bit 0-1) of the HT control field 1819 of FIG. 18 comprising 4 octets are set to '11', the remaining bits (Bit 2-31) of the HT control field 1819 may be allocated to the A-Control subfield 2310 of FIG. 23.

The A-Control field 2310 may include a sequence of at least one control subfield (Control 1, . . . , Control N). For example, the N-th control subfield 2320 may include a control ID subfield 2330 having a length of 4 bits and a control information subfield 2340 having a variable length.

For example, since the first control subfield (Control 1) is the first subfield of the A-Control field 2310, the control ID subfield 2330 included in the first control subfield (Control 1) may be set to '0'.

The control ID subfield 2330 may indicate the type of information included in the control information subfield 2340. The control information subfield 2340 related to the value of the control ID subfield 2330 may be defined as shown in Table 3 below.

TABLE 3

| Control ID value | Meaning | Length of the Control Information subfield (bits) |
|---|---|---|
| 0 | UL MU response scheduling | 26 |
| 1 | Operating Mode | 12 |
| 2 | HE link adaptation | 16 |
| 3 | Buffer Status Report (BSR) | 26 |
| 4 | UL Power Headroom | 8 |
| 5 | Bandwidth Query Report (BQR) | 10 |
| 6-15 | Reserved | |

Referring to Table 3, when the control ID subfield 2330 is set to '1', the control information subfield 2340 may represent information for requesting change of the operating mode of the STA which transmits a frame using 12 bits.

Referring to Table 3, when the control ID subfield 2330 is set to '3', the control information subfield 2340 may represent the information for buffer status report of the STA which transmits a frame using 26 bits.

Figure 24:
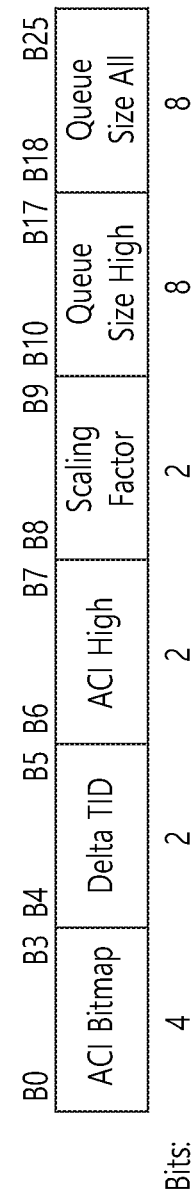
FIG. 24 shows an illustrative format of a control information subfield for buffer state report according to the present embodiment.

FIG. 24 shows an illustrative format of a control information subfield for buffer status report according to the present embodiment.

Referring to FIGS. 1 to 24, as described with reference to FIG. 18, the control information subfield for buffer status report of FIG. 24 may be used for the STA to signal information about a plurality of traffic data to the AP in case a plurality of traffic data are buffered in the queue of the STA.

As one example, the STA may signal information about a plurality of traffic data to the AP by using the eleventh to the eighteenth bit (B10-B17) allocated for information about single traffic data and the nineteenth to the twenty-sixth bit (B18-B25) allocated for information about information about the whole TID buffered in the STA.

More specific descriptions about the control information subfield for buffer status report may be understood from the clause 9.2.4.6.4.5 of the standard document IEEE P802.11ax/D1.0 disclosed in November 2016.

Figure 25:
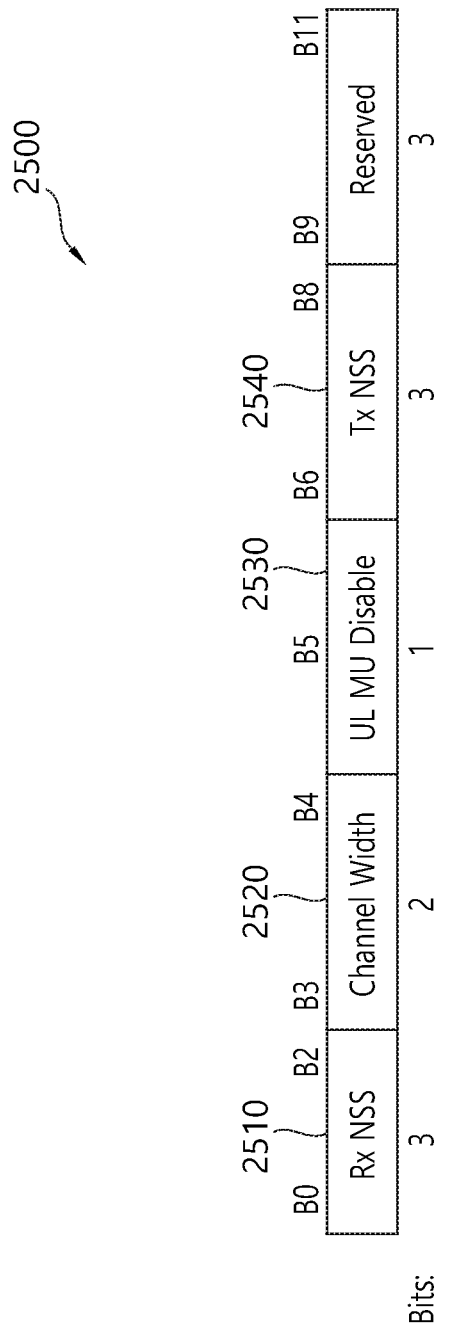
FIG. 25 shows an illustrative format of control information subfield for requesting change of operating mode according to the present embodiment.

FIG. 25 shows an illustrative format of control information subfield for requesting change of operating mode according to the present embodiment.

Referring to FIGS. 1 to 25, to request change of the operating mode described with reference to FIGS. 15 to 17, the control information subfield 2500 of the BA frame may include all or part of a plurality of subfield 2510, 2520, 2530, 2540 and may additionally include subfields not shown in FIG. 25.

The Rx NSS subfield 2510 of FIG. 25 may indicate the maximum number of spatial streams used by the STA (for example, non-AP STA) which transmits the control information subfield 2500 for requesting change of the operating mode to receive a signal (for example, PPDU). For example, the Rx NSS subfield 2510 may comprise 3 bits.

For example, the Rx NSS subfield 1210 of FIG. 25 may indicate the number of spatial streams used by the STA to receive a downlink PPDU. In other words, the AP may configure a downlink PPDU for a specific user STA by referring to the corresponding subfield 2510.

The channel width subfield 2520 may indicate the operating channel width supported by the STA (for example, non-AP STA) which transmits the control information subfield for requesting change of the operating mode.

For example, if the channel width subfield 2520 is set to '0', it indicates that the operating channel width is 20 MHz; if '1', the operating channel width is 40 MHz; if '2', it is 80 MHz; and if '3', it is 160 MHz or 80+80 MHz.

The control width subfield 2520 may indicate the maximum channel bandwidth that each STA can transmit in response to the trigger frame. The channel width subfield 2520 may indicate a transmission channel or reception channel used by the STA which transmits the control information subfield 2500.

The UL MU Disable subfield 2530 may indicate whether an STA (for example, non-AP STA) transmitting the control information subfield 2500 participates in the UL MU MIMO transmission.

For example, in case an STA decides not to participate in the UL MU MIMO transmission for a specific reason (namely in case the UL MU operation is suspended), a specific value (for example, "1") may be set to the UL MU Disable subfield 2530.

As another example, in case an STA decides to participate in the UL MU MIMO transmission for a specific reason (namely in case the UL MU operation is resumed), a specific value (for example, "0") may be set to the UL MU Disable subfield 2530. In other words, the information included in the UL MU Disable subfield 2530 may be understood as a control indicator described with reference to FIGS. 15 to 17.

To perform effective UL MU communication, the AP according to the present invention may allocate a resource unit to the trigger frame according to the uplink frame including the UL MU Disable subfield 2530. When the trigger frame for the UL MU procedure is configured (namely the trigger frame of FIG. 9), the corresponding subfield 2530 may be used.

The Tx NSS subfield 2540 of FIG. 25 may indicate the maximum number of spatial streams used by the STA which transmits the control information subfield 2500 for transmission of a signal (for example, PPDU). The Tx NSS subfield 2540 may indicate the maximum number of spatial streams that each STA may transmit in response to the trigger frame.

Although the example of FIG. 25 illustrates the case in which the Rx NSS 2510 and Tx NSS 2540 subfield are configured separately, the corresponding subfield may be modified. For example, it is possible to indicate the Rx NSS (namely the number of spatial streams used by a specific STA for PPDU reception) and Tx NSS (namely the number of spatial streams used by a specific STA for PPDU transmission) commonly through one NSS subfield.

FIG. 26 illustrates a QoS control field for requesting change of operating mode in the control information subfield for buffer state report according to the present embodiment.

Referring to FIGS. 24 and 26, the QoS control field of FIG. 26 may include a rev subfield (which comprises two bits and is set to '11' in the case of FIG. 24), control ID subfield (4 bits), and control information subfield (26 bits).

The control information subfield of FIG. 26 may be understood from the descriptions given through FIG. 24. However, the control information subfield according to the embodiment of FIG. 26 may further include a indication subfield (1 bit) for the control indicator illustrated with reference to FIGS. 15 to 17. Accordingly, an STA may inform the AP of the information about change of the operating mode of the STA in an explicit manner.

Figure 27:
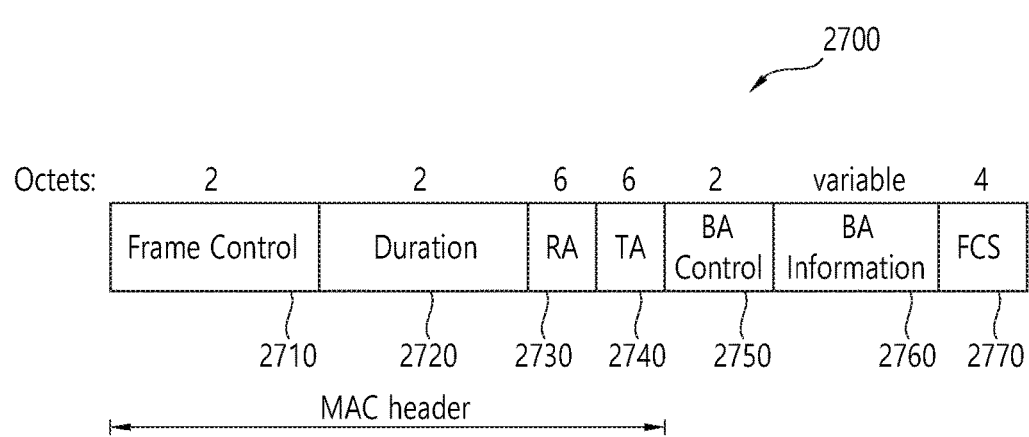
FIGS. 27 and 28 shows an illustrative format of a BA frame.
Figure 28:
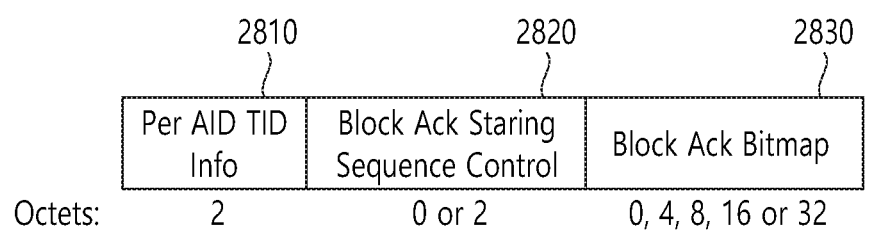

FIGS. 27 and 28 shows an illustrative format of a BA frame. With reference to FIGS. 1 to 27, the BA frame 2700 may include a frame control field 2710, duration field 2720, RA field 2730, TA field 2740, BA control field 2750, BA control field 2760, and FCS field 2770.

In particular, the BA control field 2750 is a common control field, and BA information field 2760 is a user-specific field for each user STA. The BA information field 2760 may include the subfield of FIG. 28 allocated individually for each user STA.

More specifically, the AP may include identification information (for example, AID information, ACK-based information, and TID information) for a plurality of user STAs which have transmitted a plurality of uplink frames to the Per AID TID Info field 2810 of FIG. 28.

Also, the AP may inform each user STA about whether MSDU or A-MASU comprising a plurality of uplink frames using the BA starting sequence control field 2820 and BA bitmap field 2830 has been received successfully.

The BA frame 2700 may be regarded as the BA frame described with reference to FIGS. 15 to 17 above. In other words, to indicate successful reception of a plurality of uplink frames transmitted from a plurality of user STAs for each user STA, the AP may use the BA frame 2700. The BA frame of FIG. 27 is described in more detail in the clause 9.3.1.9.7 of the standard document IEEE P802.11ax/D1.0 disclosed in November 2016.

Figure 29:
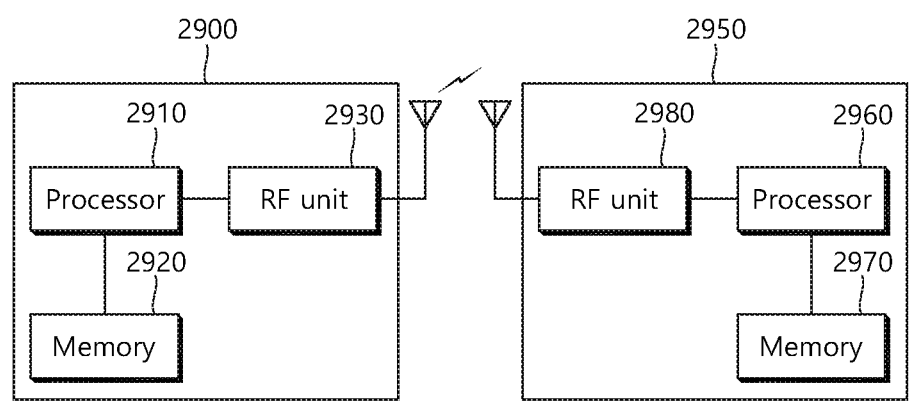
FIG. 29 illustrates a block diagram of a wireless device to which the present embodiment may be applied.

FIG. 29 is a block view illustrating a wireless device to which the exemplary embodiment of the present invention can be applied.

Referring to FIG. 29, as an STA that can implement the above-described exemplary embodiment, the wireless device may correspond to an AP or a non-AP station (STA). The wireless device may correspond to the above-described user or may correspond to a transmitting device transmitting a signal to the user.

The AP 2900 includes a processor 2910, a memory 2920, and a radio frequency (RF) unit 2930.

The RF unit 2930 is connected to the processor 2910, thereby being capable of transmitting and/or receiving radio signals.

The processor 2910 implements the functions, processes, and/or methods proposed in the present invention. For example, the processor 2910 may be implemented to perform the operations according to the above-described exemplary embodiments of the present invention. More specifically, among the operations that are disclosed in the exemplary embodiments of FIG. 1 to FIG. 28, the processor 2910 may perform the operations that may be performed by the AP.

The non-AP STA 2950 includes a processor 2960, a memory 2970, and a radio frequency (RF) unit 2980.

The RF unit 2980 is connected to the processor 2960, thereby being capable of transmitting and/or receiving radio signals.

The processor 2960 implements the functions, processes, and/or methods proposed in the present invention. For example, the processor 2960 may be implemented to perform the operations of the non-AP STA according to the above-described exemplary embodiments of the present invention. The processor may perform the operations of the non-AP STA, which are disclosed in the exemplary embodiments of FIG. 1 to FIG. 28.

The processor 1710 and 1760 may include an application-specific integrated circuit (ASIC), another chip set, a logical circuit, a data processing device, and/or a converter converting a baseband signal and a radio signal to and from one another. The memory 1720 and 1770 may include a read-only memory (ROM), a random access memory (RAM), a flash memory, a memory card, a storage medium, and/or another storage device. The RF unit 1730 and 1780 may include one or more antennas transmitting and/or receiving radio signals.

When the exemplary embodiment is implemented as software, the above-described method may be implemented as a module (process, function, and so on) performing the above-described functions. The module may be stored in the memory 1720 and 1770 and may be executed by the processor 1710 and 1760. The memory 1720 and 1770 may be located inside or outside of the processor 1710 and 1760 and may be connected to the processor 1610 and 1660 through a diversity of well-known means.

Although this document describes specific embodiments of the present invention, various modifications of the present invention may be made without departing from the technical scope of the present invention. Therefore, the technical scope of the present invention should not be construed as being limited to the embodiments described above but should be defined not only by the appended claims but also the equivalents of the claims of the present invention.

What is claimed is:

1. A method of supporting for uplink multi-user (UL MU) transmission in a wireless local area network (WLAN) system, the method comprising:

transmitting, to an access point (AP) by a station (STA), a control frame during a first duration, wherein the control frame includes an operating mode (OM) field having a first value, wherein the OM field has the first value when the UL MU MIMO transmission is resumed by the STA, and wherein the OM field has a second value when the UL MU MIMO transmission is suspended by the STA;

determining, by the STA, whether a trigger frame soliciting the UL MU transmission is received during a second duration subsequent to the first duration, wherein the trigger frame includes:

first information for identifying a plurality of STAs related to the UL MU transmission, second information for each of a plurality of uplink frequency resources allocated for the plurality of STAs, third information for a time interval during which the UL MU MIMO transmission is performed, fourth information for modulation and coding scheme (MCS) applied to the plurality of STAs, and fifth information for a channel coding scheme for the plurality of STAs;

when the trigger frame is received during the second duration, transmitting, by the STA, a trigger-based packet to the AP, wherein the trigger-based packet includes a buffer status report (BSR) of the STA, and wherein an interval between the trigger frame and the trigger-based packet is set to a short inter-frame space (SIFS); and when the trigger frame is not received during the second duration, transmitting, by the STA, a data packet to the AP after the second duration, the data packet including the OM field having the second value.

2. The method of claim 1, wherein the control frame is a frame transmitted to the AP through a random access procedure.

3. The method of claim 1, wherein the control frame is transmitted based on a Quality of Service (QoS) data frame or QoS null frame.

4. A wireless device using a method of supporting for uplink multi-user (UL MU) transmission in a wireless local area network (WLAN) system, comprising:

a transceiver transmitting and receiving a radio signal; and a processor connected to the transceiver, wherein the processor is configured transmit a control frame to an access point (AP) during a first duration, wherein the control frame includes an operating mode (OM) field having a first value, wherein the OM field has the first value when the UL MU MIMO transmission is resumed by the STA, and wherein the OM field has a second value when the UL MU MIMO transmission is suspended by the STA;

determine whether a trigger frame soliciting the UL MU transmission is received during a second duration subsequent to the first duration, wherein the trigger frame includes:
  first information for identifying a plurality of STAs related to the UL MU transmission,
  second information for a plurality of uplink frequency resources allocated for the plurality of STAs,
  third information for a time interval during which the UL MU MIMO transmission is performed,
  fourth information for modulation and coding scheme (MCS) applied to the plurality of STAs, and
  fifth information for a channel coding scheme for the plurality of STAs; and
when the trigger frame is received during the second duration, transmit a trigger-based packet to the AP,
wherein the trigger-based packet includes a buffer status report (BSR) of the STA,
wherein an interval between the trigger frame and the trigger-based packet is set to a short inter-frame space (SIFS),
when the trigger frame is not received during the second duration, transmit a data packet to the AP after the second duration, the data packet including the OM field having the second value.

5. The method of claim 1, further comprising:
after transmitting the data packet to the AP, performing, by the STA, an enhanced distributed channel access (EDCA) to the AP.

6. The STA of claim 4, wherein the processor is further configured to perform an enhanced distributed channel access (EDCA) to the AP after transmitting the data packet to the AP.

* * * * *